(12) United States Patent
Sanchez et al.

(10) Patent No.: US 10,915,825 B2
(45) Date of Patent: *Feb. 9, 2021

(54) METHOD FOR PERFORMING A COGNITIVE LEARNING LIFECYCLE OPERATION

(71) Applicant: Cognitive Scale, Inc., Austin, TX (US)

(72) Inventors: Matthew Sanchez, Austin, TX (US); Manoj Saxena, Austin, TX (US)

(73) Assignee: Cognitive Scale, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/434,493

(22) Filed: Jun. 7, 2019

(65) Prior Publication Data

US 2019/0311276 A1    Oct. 10, 2019

Related U.S. Application Data

(63) Continuation of application No. 14/869,204, filed on Sep. 29, 2015, now Pat. No. 10,325,213.

(51) Int. Cl.
*G06N 5/04* (2006.01)
(52) U.S. Cl.
CPC .................................... *G06N 5/04* (2013.01)

(58) Field of Classification Search
None
See application file for complete search history.

(56) References Cited

U.S. PATENT DOCUMENTS

2014/0171039 A1    6/2014  Bjontegard
2015/0278688 A1   10/2015  Miao et al.

OTHER PUBLICATIONS

List of Patents or Patent Applications Treated as Related, 2019.

*Primary Examiner* — Alan Chen
(74) *Attorney, Agent, or Firm* — Terrile, Cannatti & Chambers; Stephen A. Terrile

(57) ABSTRACT

A cognitive learning method comprising: receiving data from a plurality of data sources; processing the data from the plurality of data sources to perform a cognitive learning operation, the processing being performed via a cognitive inference and learning system, the cognitive learning operation comprising a plurality of cognitive learning operation lifecycle phases, the cognitive learning operation applying a cognitive learning technique to generate a cognitive learning result; and, updating a destination based upon the cognitive learning result.

6 Claims, 12 Drawing Sheets

METHOD FOR PERFORMING A COGNITIVE LEARNING LIFECYCLE OPERATION

BACKGROUND OF THE INVENTION

Field of the Invention

The present invention relates in general to the field of computers and similar technologies, and in particular to software utilized in this field. Still more particularly, it relates to a method, system and computer-usable medium for performing cognitive inference and learning operations.

Description of the Related Art

In general, "big data" refers to a collection of datasets so large and complex that they become difficult to process using typical database management tools and traditional data processing approaches. These datasets can originate from a wide variety of sources, including computer systems, mobile devices, credit card transactions, television broadcasts, and medical equipment, as well as infrastructures associated with cities, sensor-equipped buildings and factories, and transportation systems. Challenges commonly associated with big data, which may be a combination of structured, unstructured, and semi-structured data, include its capture, curation, storage, search, sharing, analysis and visualization. In combination, these challenges make it difficult to efficiently process large quantities of data within tolerable time intervals.

Nonetheless, big data analytics hold the promise of extracting insights by uncovering difficult-to-discover patterns and connections, as well as providing assistance in making complex decisions by analyzing different and potentially conflicting options. As such, individuals and organizations alike can be provided new opportunities to innovate, compete, and capture value.

One aspect of big data is "dark data," which generally refers to data that is either not collected, neglected, or underutilized. Examples of data that is not currently being collected includes location data prior to the emergence of companies such as Foursquare or social data prior to the advent companies such as Facebook. An example of data that is being collected, but is difficult to access at the right time and place, includes data associated with the side effects of certain spider bites while on a camping trip. As another example, data that is collected and available, but has not yet been productized of fully utilized, may include disease insights from population-wide healthcare records and social media feeds. As a result, a case can be made that dark data may in fact be of higher value than big data in general, especially as it can likely provide actionable insights when it is combined with readily-available data.

SUMMARY OF THE INVENTION

In one embodiment, the invention relates to a cognitive learning method comprising: receiving data from a plurality of data sources; processing the data from the plurality of data sources to perform a cognitive learning operation, the processing being performed via a cognitive inference and learning system, the cognitive learning operation comprising a plurality of cognitive learning operation lifecycle phases, the cognitive learning operation applying a cognitive learning technique to generate a cognitive learning result; and, updating a destination based upon the cognitive learning result.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
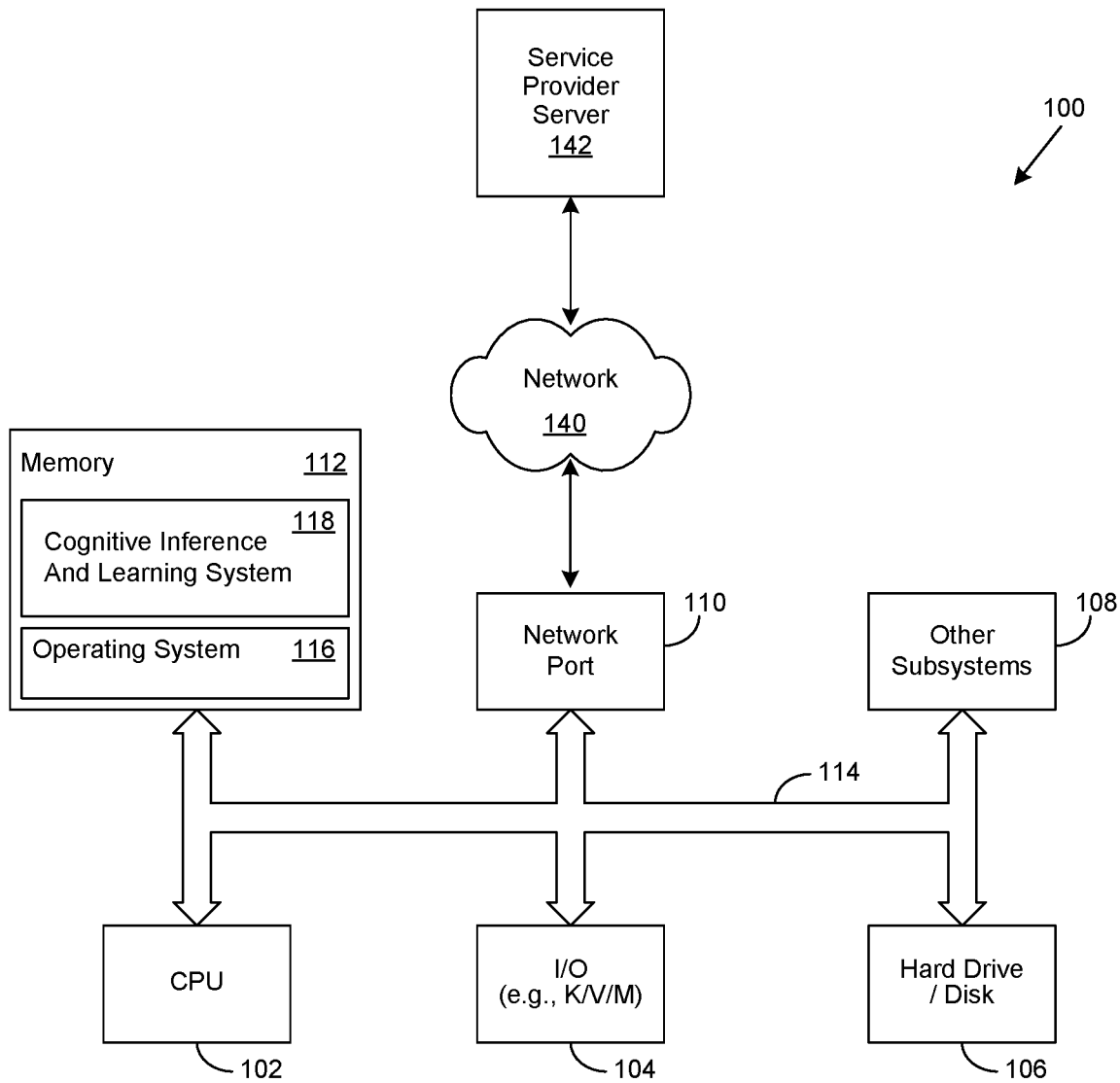
FIG. 1 depicts an exemplary client computer in which the present invention may be implemented.

A method, system and computer-usable medium are disclosed for cognitive inference and learning operations. The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 is a generalized illustration of an information processing system 100 that can be used to implement the system and method of the present invention. The information processing system 100 includes a processor (e.g., central processor unit or "CPU") 102, input/output (I/O) devices 104, such as a display, a keyboard, a mouse, and associated controllers, a hard drive or disk storage 106, and various other subsystems 108. In various embodiments, the information processing system 100 also includes network port 110 operable to connect to a network 140, which is likewise accessible by a service provider server 142. The information processing system 100 likewise includes system memory 112, which is interconnected to the foregoing via one or more buses 114. System memory 112 further comprises operating system (OS) 116 and in various embodiments may also comprise cognitive inference and learning system (CILS) 118. In these and other embodiments, the CILS 118 may likewise comprise invention modules 120. In one embodiment, the information processing system 100 is able to download the CILS 118 from the service provider server 142. In another embodiment, the CILS 118 is provided as a service from the service provider server 142.

In various embodiments, the CILS 118 is implemented to perform various cognitive computing operations described in greater detail herein. As used herein, cognitive computing broadly refers to a class of computing involving self-learning systems that use techniques such as spatial navigation, machine vision, and pattern recognition to increasingly mimic the way the human brain works. To be more specific, earlier approaches to computing typically solved problems by executing a set of instructions codified within software. In contrast, cognitive computing approaches are data-driven, sense-making, insight-extracting, problem-solving systems that have more in common with the structure of the human brain than with the architecture of contemporary, instruction-driven computers.

To further differentiate these distinctions, traditional computers must first be programmed by humans to perform specific tasks, while cognitive systems learn from their interactions with data and humans alike, and in a sense, program themselves to perform new tasks. To summarize the difference between the two, traditional computers are designed to calculate rapidly. Cognitive systems are designed to quickly draw inferences from data and gain new knowledge.

Cognitive systems achieve these abilities by combining various aspects of artificial intelligence, natural language processing, dynamic learning, and hypothesis generation to render vast quantities of intelligible data to assist humans in making better decisions. As such, cognitive systems can be characterized as having the ability to interact naturally with people to extend what either humans, or machines, could do on their own. Furthermore, they are typically able to process natural language, multi-structured data, and experience much in the same way as humans. Moreover, they are also typically able to learn a knowledge domain based upon the best available data and get better, and more immersive, over time.

It will be appreciated that more data is currently being produced every day than was recently produced by human beings from the beginning of recorded time. Deep within this ever-growing mass of data is a class of data known as "dark data," which includes neglected information, ambient signals, and insights that can assist organizations and individuals in augmenting their intelligence and deliver actionable insights through the implementation of cognitive applications. As used herein, cognitive applications, or "cognitive apps," broadly refer to cloud-based, big data interpretive applications that learn from user engagement and data interactions. Such cognitive applications extract patterns and insights from dark data sources that are currently almost completely opaque. Examples of such dark data include disease insights from population-wide healthcare records and social media feeds, or from new sources of information, such as sensors monitoring pollution in delicate marine environments.

Over time, it is anticipated that cognitive applications will fundamentally change the ways in which many organizations operate as they invert current issues associated with data volume and variety to enable a smart, interactive data supply chain. Ultimately, cognitive applications hold the promise of receiving a user query and immediately providing a data-driven answer from a masked data supply chain in response. As they evolve, it is likewise anticipated that cognitive applications may enable a new class of "sixth sense" applications that intelligently detect and learn from relevant data and events to offer insights, predictions and advice rather than wait for commands. Just as web and mobile applications changed the way people access data, cognitive applications may change the way people listen to, and become empowered by, multi-structured data such as emails, social media feeds, doctors notes, transaction records, and call logs.

However, the evolution of such cognitive applications has associated challenges, such as how to detect events, ideas, images, and other content that may be of interest. For example, assuming that the role and preferences of a given user are known, how is the most relevant information discovered, prioritized, and summarized from large streams of multi-structured data such as news feeds, blogs, social media, structured data, and various knowledge bases? To further the example, what can a healthcare executive be told about their competitor's market share? Other challenges include the creation of a contextually-appropriate visual summary of responses to questions or queries.

Figure 2:
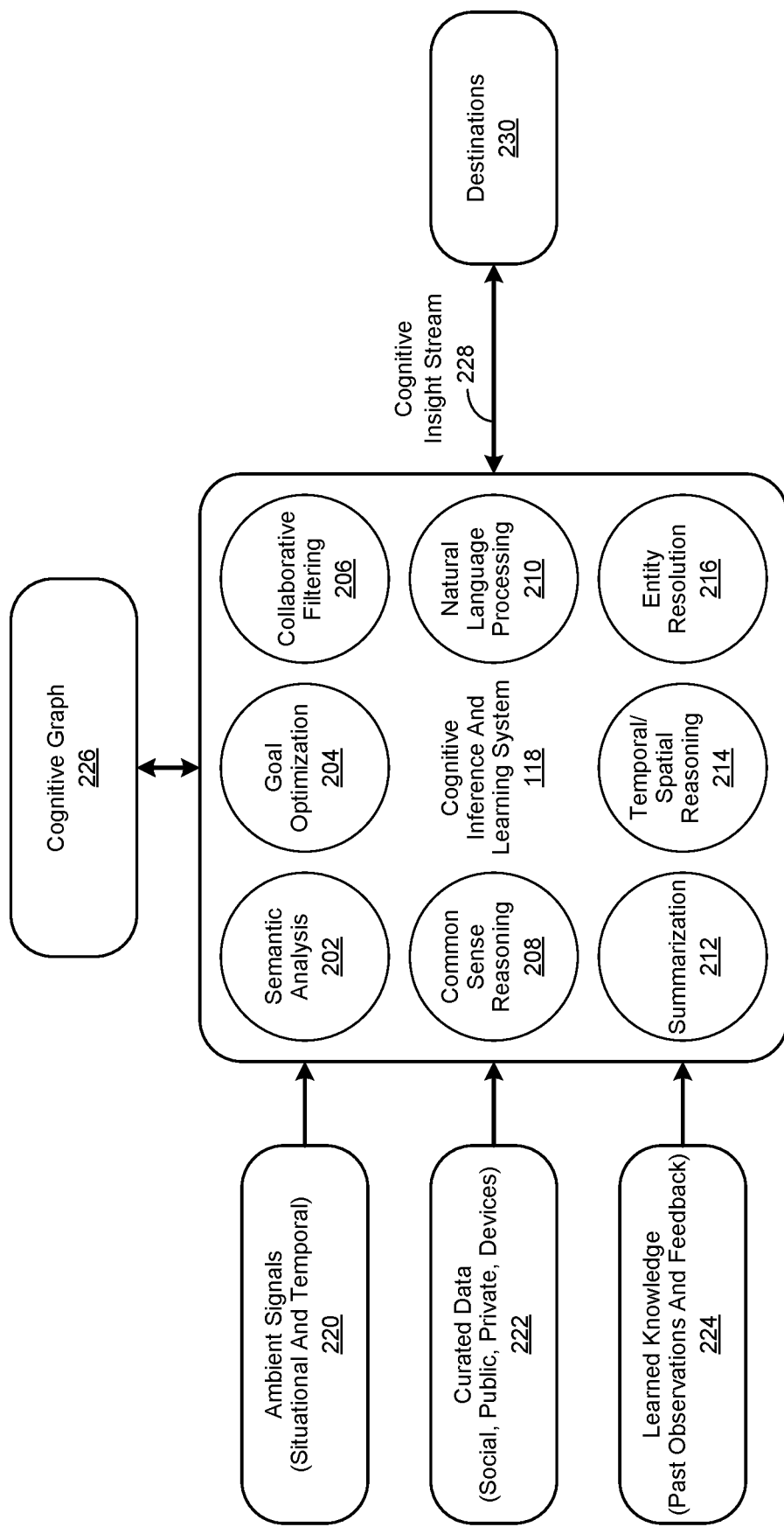
FIG. 2 is a simplified block diagram of a cognitive inference and learning system (CILS)

FIG. 2 is a simplified block diagram of a cognitive inference and learning system (CILS) implemented in accordance with an embodiment of the invention. In various embodiments, the CILS 118 is implemented to incorporate a variety of processes, including semantic analysis 202, goal optimization 204, collaborative filtering 206, common sense reasoning 208, natural language processing 210, summarization 212, temporal/spatial reasoning 214, and entity resolution 216 to generate cognitive insights.

As used herein, semantic analysis 202 broadly refers to performing various analysis operations to achieve a semantic level of understanding about language by relating syntactic structures. In various embodiments, various syntactic structures are related from the levels of phrases, clauses, sentences and paragraphs, to the level of the body of content as a whole and to its language-independent meaning. In certain embodiments, the semantic analysis 202 process includes processing a target sentence to parse it into its individual parts of speech, tag sentence elements that are related to predetermined items of interest, identify dependencies between individual words, and perform co-reference resolution. For example, if a sentence states that the author really likes the hamburgers served by a particular restaurant, then the name of the "particular restaurant" is co-referenced to "hamburgers."

As likewise used herein, goal optimization 204 broadly refers to performing multi-criteria decision making operations to achieve a given goal or target objective. In various embodiments, one or more goal optimization 204 processes are implemented by the CILS 118 to define predetermined goals, which in turn contribute to the generation of a cognitive insight. For example, goals for planning a vacation trip may include low cost (e.g., transportation and accommodations), location (e.g., by the beach), and speed (e.g., short travel time). In this example, it will be appreciated that certain goals may be in conflict with another. As a result, a cognitive insight provided by the CILS 118 to a traveler may indicate that hotel accommodations by a beach may cost more than they care to spend.

Collaborative filtering 206, as used herein, broadly refers to the process of filtering for information or patterns through the collaborative involvement of multiple agents, viewpoints, data sources, and so forth. The application of such collaborative filtering 206 processes typically involves very large and different kinds of data sets, including sensing and monitoring data, financial data, and user data of various kinds. Collaborative filtering 206 may also refer to the process of making automatic predictions associated with predetermined interests of a user by collecting preferences or other information from many users. For example, if person 'A' has the same opinion as a person 'B' for a given issue 'x', then an assertion can be made that person 'A' is more likely to have the same opinion as person 'B' opinion on a different issue 'y' than to have the same opinion on issue 'y' as a randomly chosen person. In various embodiments, the collaborative filtering 206 process is implemented with various recommendation engines familiar to those of skill in the art to make recommendations.

As used herein, common sense reasoning 208 broadly refers to simulating the human ability to make deductions from common facts they inherently know. Such deductions may be made from inherent knowledge about the physical properties, purpose, intentions and possible behavior of ordinary things, such as people, animals, objects, devices, and so on. In various embodiments, common sense reasoning 208 processes are implemented to assist the CILS 118 in understanding and disambiguating words within a predetermined context. In certain embodiments, the common sense reasoning 208 processes are implemented to allow the CILS 118 to generate text or phrases related to a target word or phrase to perform deeper searches for the same terms. It will be appreciated that if the context of a word is better understood, then a common sense understanding of the word can then be used to assist in finding better or more accurate information. In certain embodiments, this better or more accurate understanding of the context of a word, and its related information, allows the CILS 118 to make more accurate deductions, which are in turn used to generate cognitive insights.

As likewise used herein, natural language processing (NLP) 210 broadly refers to interactions with a system, such as the CILS 118, through the use of human, or natural, languages. In various embodiments, various NLP 210 processes are implemented by the CILS 118 to achieve natural language understanding, which enables it to not only derive meaning from human or natural language input, but to also generate natural language output.

Summarization 212, as used herein, broadly refers to processing a set of information, organizing and ranking it, and then generating a corresponding summary. As an example, a news article may be processed to identify its primary topic and associated observations, which are then extracted, ranked, and then presented to the user. As another example, page ranking operations may be performed on the same news article to identify individual sentences, rank them, order them, and determine which of the sentences are most impactful in describing the article and its content. As yet another example, a structured data record, such as a patient's electronic medical record (EMR), may be processed using the summarization 212 process to generate sentences and phrases that describes the content of the EMR. In various embodiments, various summarization 212 processes are implemented by the CILS 118 to generate summarizations of content streams, which are in turn used to generate cognitive insights.

As used herein, temporal/spatial reasoning 214 broadly refers to reasoning based upon qualitative abstractions of temporal and spatial aspects of common sense knowledge, described in greater detail herein. For example, it is not uncommon for a predetermined set of data to change over time. Likewise, other attributes, such as its associated metadata, may likewise change over time. As a result, these changes may affect the context of the data. To further the example, the context of asking someone what they believe they should be doing at 3:00 in the afternoon during the workday while they are at work may be quite different that asking the same user the same question at 3:00 on a Sunday afternoon when they are at home. In various embodiments, various temporal/spatial reasoning 214 processes are implemented by the CILS 118 to determine the context of queries, and associated data, which are in turn used to generate cognitive insights.

As likewise used herein, entity resolution 216 broadly refers to the process of finding elements in a set of data that refer to the same entity across different data sources (e.g., structured, non-structured, streams, devices, etc.), where the target entity does not share a common identifier. In various embodiments, the entity resolution 216 process is implemented by the CILS 118 to identify significant nouns, adjectives, phrases or sentence elements that represent various predetermined entities within one or more domains. From the foregoing, it will be appreciated that the implementation of one or more of the semantic analysis 202, goal optimization 204, collaborative filtering 206, common sense reasoning 208, natural language processing 210, summarization 212, temporal/spatial reasoning 214, and entity resolution 216 processes by the CILS 118 can facilitate the generation of a semantic, cognitive model.

In various embodiments, the CILS 118 receives ambient signals 220, curated data 222, and learned knowledge, which is then processed by the CILS 118 to generate one or more cognitive graphs 226. In turn, the one or more cognitive graphs 226 are further used by the CILS 118 to generate cognitive insight streams, which are then delivered to one or more destinations 230, as described in greater detail herein.

As used herein, ambient signals 220 broadly refer to input signals, or other data streams, that may contain data providing additional insight or context to the curated data 222 and learned knowledge 224 received by the CILS 118. For example, ambient signals may allow the CILS 118 to understand that a user is currently using their mobile device, at location 'x', at time 'y', doing activity 'z'. To further the example, there is a difference between the user using their mobile device while they are on an airplane versus using their mobile device after landing at an airport and walking between one terminal and another. To extend the example even further, ambient signals may add additional context, such as the user is in the middle of a three leg trip and has two hours before their next flight. Further, they may be in terminal A1, but their next flight is out of C1, it is lunchtime, and they want to know the best place to eat. Given the available time the user has, their current location, restaurants that are proximate to their predicted route, and other factors such as food preferences, the CILS 118 can perform various cognitive operations and provide a recommendation for where the user can eat.

In various embodiments, the curated data 222 may include structured, unstructured, social, public, private, streaming, device or other types of data described in greater detail herein. In certain embodiments, the learned knowledge 224 is based upon past observations and feedback from the presentation of prior cognitive insight streams and recommendations. In various embodiments, the learned knowledge 224 is provided via a feedback look that provides the learned knowledge 224 in the form of a learning stream of data.

As likewise used herein, a cognitive graph 226 refers to a representation of expert knowledge, associated with individuals and groups over a period of time, to depict relationships between people, places, and things using words, ideas, audio and images. As such, it is a machine-readable formalism for knowledge representation that provides a common framework allowing data and knowledge to be shared and reused across user, application, organization, and community boundaries.

In various embodiments, the information contained in, and referenced by, a cognitive graph 226 is derived from many sources (e.g., public, private, social, device), such as curated data 222. In certain of these embodiments, the cognitive graph 226 assists in the identification and organization of information associated with how people, places and things are related to one other. In various embodiments, the cognitive graph 226 enables automated agents, described in greater detail herein, to access the Web more intelligently, enumerate inferences through utilization of curated, structured data 222, and provide answers to questions by serving as a computational knowledge engine.

In certain embodiments, the cognitive graph 226 not only elicits and maps expert knowledge by deriving associations from data, it also renders higher level insights and accounts for knowledge creation through collaborative knowledge modeling. In various embodiments, the cognitive graph 226 is a machine-readable, declarative memory system that stores and learns both episodic memory (e.g., specific personal experiences associated with an individual or entity), and semantic memory, which stores factual information (e.g., geo location of an airport or restaurant).

For example, the cognitive graph 226 may know that a given airport is a place, and that there is a list of related places such as hotels, restaurants and departure gates. Furthermore, the cognitive graph 226 may know that people such as business travelers, families and college students use the airport to board flights from various carriers, eat at various restaurants, or shop at certain retail stores. The cognitive graph 226 may also have knowledge about the key attributes from various retail rating sites that travelers have used to describe the food and their experience at various venues in the airport over the past six months.

In certain embodiments, the cognitive insight stream 228 is bidirectional, and supports flows of information both too and from destinations 230. In these embodiments, the first flow is generated in response to receiving a query, and subsequently delivered to one or more destinations 230. The second flow is generated in response to detecting information about a user of one or more of the destinations 230. Such use results in the provision of information to the CILS 118. In response, the CILS 118 processes that information, in the context of what it knows about the user, and provides additional information to the user, such as a recommendation. In various embodiments, the cognitive insight stream 228 is configured to be provided in a "push" stream configuration familiar to those of skill in the art. In certain embodiments, the cognitive insight stream 228 is implemented to use natural language approaches familiar to skilled practitioners of the art to support interactions with a user.

In various embodiments, the cognitive insight stream 228 may include a stream of visualized insights. As used herein, visualized insights broadly refers to cognitive insights that are presented in a visual manner, such as a map, an infographic, images, and so forth. In certain embodiments, these visualized insights may include various cognitive insights, such as "What happened?", "What do I know about it?", "What is likely to happen next?", or "What should I do about it?" In these embodiments, the cognitive insight stream is generated by various cognitive agents, which are applied to various sources, datasets, and cognitive graphs. As used herein, a cognitive agent broadly refers to a computer program that performs a task with minimum specific directions from users and learns from each interaction with data and human users.

In various embodiments, the CILS 118 delivers Cognition as a Service (CaaS). As such, it provides a cloud-based development and execution platform that allow various cognitive applications and services to function more intelligently and intuitively. In certain embodiments, cognitive applications powered by the CILS 118 are able to think and interact with users as intelligent virtual assistants. As a result, users are able to interact with such cognitive applications by asking them questions and giving them commands. In response, these cognitive applications will be able to assist the user in completing tasks and managing their work more efficiently.

In these and other embodiments, the CILS 118 can operate as an analytics platform to process big data, and dark data as well, to provide data analytics through a public, private or hybrid cloud environment. As used herein, cloud analytics broadly refers to a service model wherein data sources, data models, processing applications, computing power, analytic models, and sharing or storage of results are implemented within a cloud environment to perform one or more aspects of analytics.

In various embodiments, users submit queries and computation requests in a natural language format to the CILS 118. In response, they are provided with a ranked list of relevant answers and aggregated information with useful links and pertinent visualizations through a graphical representation. In these embodiments, the cognitive graph 226 generates semantic and temporal maps to reflect the organization of unstructured data and to facilitate meaningful learning from potentially millions of lines of text, much in the same way as arbitrary syllables strung together create meaning through the concept of language.

Figure 3:
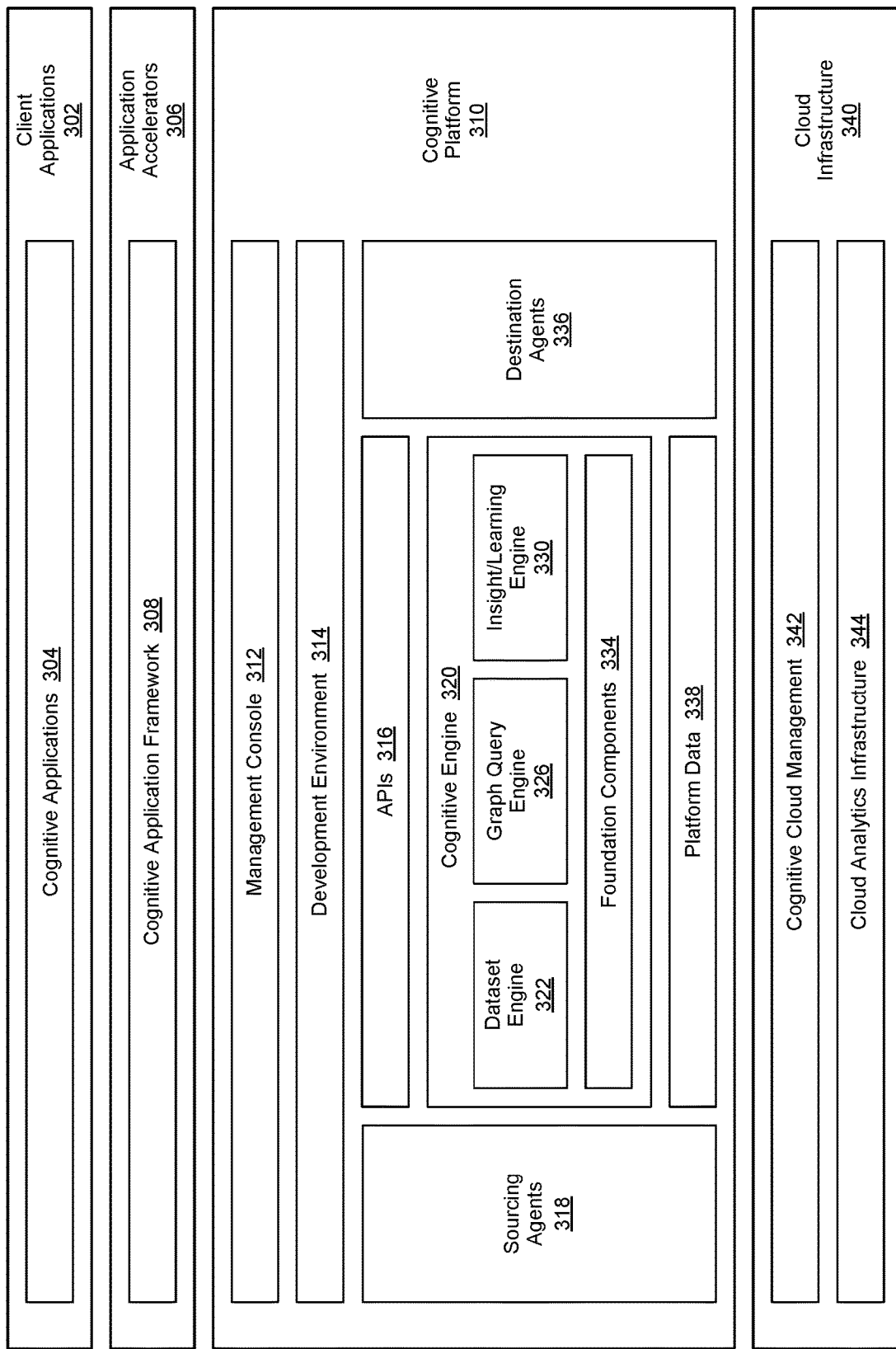
FIG. 3 is a simplified block diagram of a CILS reference model implemented in accordance with an embodiment of the invention.

FIG. 3 is a simplified block diagram of a cognitive inference and learning system (CILS) reference model implemented in accordance with an embodiment of the invention. In this embodiment, the CILS reference model is associated with the CILS 118 shown in FIG. 2. As shown in FIG. 3, the CILS 118 includes client applications 302, application accelerators 306, a cognitive platform 310, and cloud infrastructure 340. In various embodiments, the client applications 302 include cognitive applications 304, which are implemented to understand and adapt to the user, not the other way around, by natively accepting and understanding human forms of communication, such as natural language text, audio, images, video, and so forth.

In these and other embodiments, the cognitive applications 304 possess situational and temporal awareness based upon ambient signals from users and data, which facilitates understanding the user's intent, content, context and meaning to drive goal-driven dialogs and outcomes. Further, they are designed to gain knowledge over time from a wide variety of structured, non-structured, and device data sources, continuously interpreting and autonomously reprogramming themselves to better understand a given domain. As such, they are well-suited to support human decision making, by proactively providing trusted advice, offers and recommendations while respecting user privacy and permissions.

In various embodiments, the application accelerators 306 include a cognitive application framework 308. In certain embodiments, the application accelerators 306 and the cognitive application framework 308 support various plug-ins and components that facilitate the creation of client applications 302 and cognitive applications 304. In various embodiments, the application accelerators 306 include widgets, user interface (UI) components, reports, charts, and back-end integration components familiar to those of skill in the art.

As likewise shown in FIG. 3, the cognitive platform 310 includes a management console 312, a development environment 314, application program interfaces (APIs) 316, sourcing agents 318, a cognitive engine 320, destination agents 336, and platform data 338, all of which are described in greater detail herein. In various embodiments, the management console 312 is implemented to manage accounts and projects, along with user-specific metadata that is used to drive processes and operations within the cognitive platform 310 for a predetermined project.

In certain embodiments, the development environment 314 is implemented to create custom extensions to the CILS 118 shown in FIG. 2. In various embodiments, the development environment 314 is implemented for the development of a custom application, which may subsequently be deployed in a public, private or hybrid cloud environment. In certain embodiments, the development environment 314 is implemented for the development of a custom sourcing agent, a custom bridging agent, a custom destination agent, or various analytics applications or extensions.

In various embodiments, the APIs 316 are implemented to build and manage predetermined cognitive applications 304, described in greater detail herein, which are then executed on the cognitive platform 310 to generate cognitive insights. Likewise, the sourcing agents 318 are implemented in various embodiments to source a variety of multi-site, multi-structured source streams of data described in greater detail herein. In various embodiments, the cognitive engine 320 includes a dataset engine 322, a graph query engine 326, an insight/learning engine 330, and foundation components 334. In certain embodiments, the dataset engine 322 is implemented to establish and maintain a dynamic data ingestion and enrichment pipeline. In these and other embodiments, the dataset engine 322 may be implemented to orchestrate one or more sourcing agents 318 to source data. Once the data is sourced, the data set engine 322 performs data enriching and other data processing operations, described in greater detail herein, and generates one or more sub-graphs that are subsequently incorporated into a target cognitive graph.

In various embodiments, the graph query engine 326 is implemented to receive and process queries such that they can be bridged into a cognitive graph, as described in greater detail herein, through the use of a bridging agent. In certain embodiments, the graph query engine 326 performs various natural language processing (NLP), familiar to skilled practitioners of the art, to process the queries. In various embodiments, the insight/learning engine 330 is implemented to encapsulate a predetermined algorithm, which is then applied to a cognitive graph to generate a result, such as a cognitive insight or a recommendation. In certain embodiments, one or more such algorithms may contribute to answering a specific question and provide additional cognitive insights or recommendations. In various embodiments, two or more of the dataset engine 322, the graph query engine 326, and the insight/learning engine 330 may be implemented to operate collaboratively to generate a cognitive insight or recommendation. In certain embodiments, one or more of the dataset engine 322, the graph query engine 326, and the insight/learning engine 330 may operate autonomously to generate a cognitive insight or recommendation.

The foundation components 334 shown in FIG. 3 include various reusable components, familiar to those of skill in the art, which are used in various embodiments to enable the dataset engine 322, the graph query engine 326, and the insight/learning engine 330 to perform their respective operations and processes. Examples of such foundation components 334 include natural language processing (NLP) components and core algorithms, such as cognitive algorithms.

In various embodiments, the platform data 338 includes various data repositories, described in greater detail herein, that are accessed by the cognitive platform 310 to generate cognitive insights. In various embodiments, the destination agents 336 are implemented to publish cognitive insights to a consumer of cognitive insight data. Examples of such consumers of cognitive insight data include target databases, business intelligence applications, and mobile applications. It will be appreciated that many such examples of cognitive insight data consumers are possible and the foregoing is not intended to limit the spirit, scope or intent of the invention. In various embodiments, as described in greater detail herein, the cloud infrastructure 340 includes cognitive cloud management 342 components and cloud analytics infrastructure components 344.

Figure 4A:
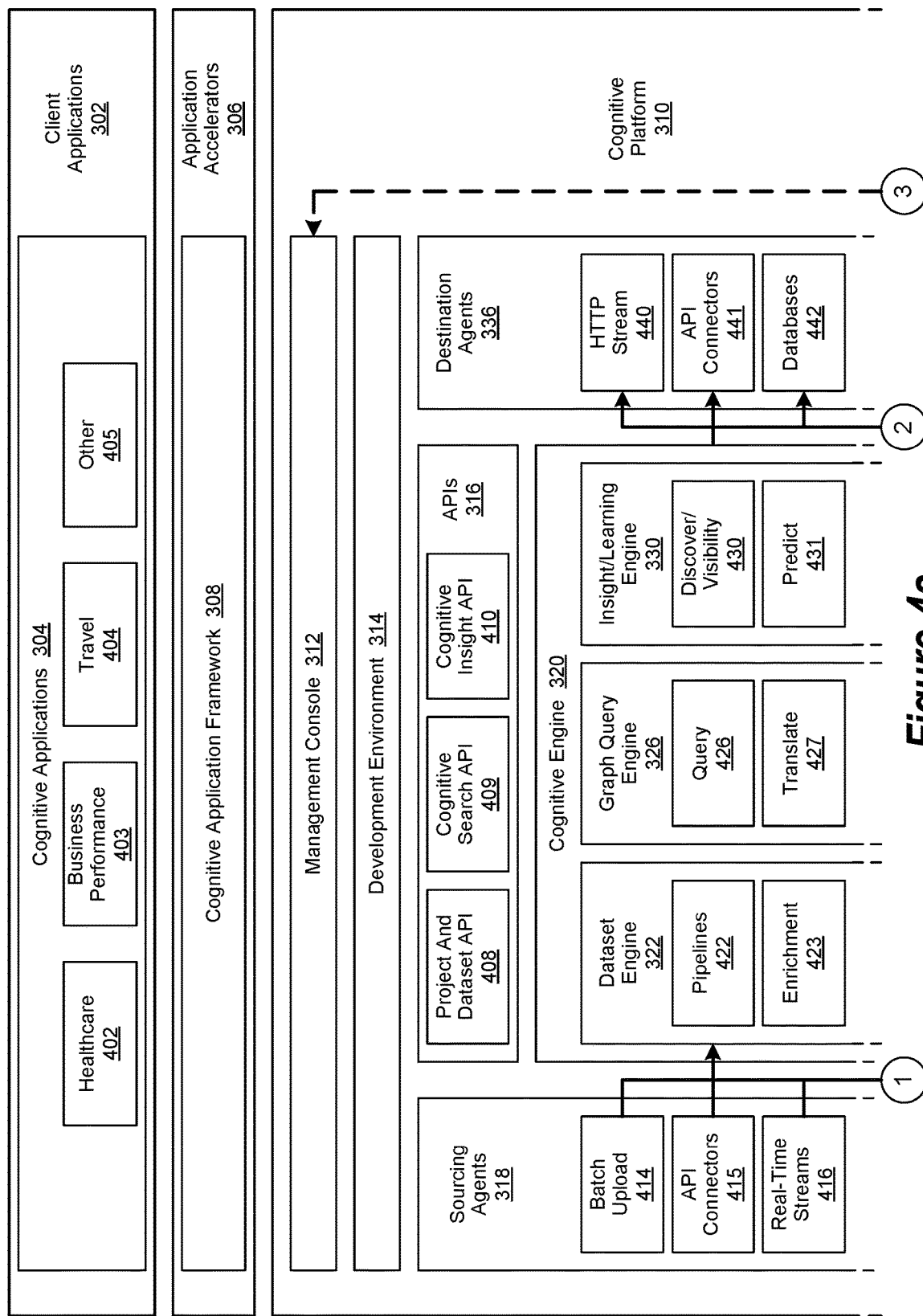
FIGS. 4a through 4c depict additional components of the CILS reference model shown in FIG. 3.
Figure 4B:
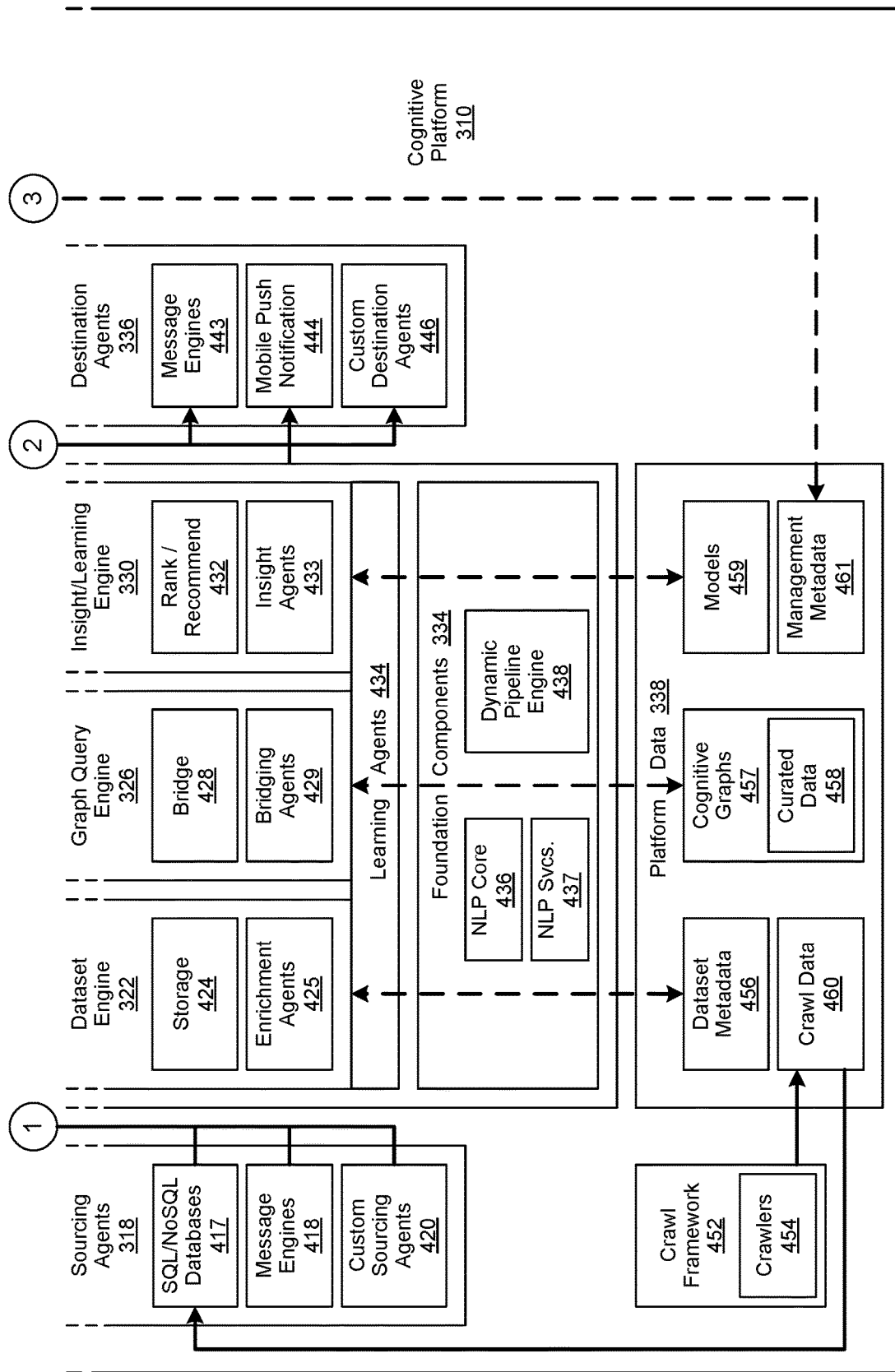
Figure 4C:
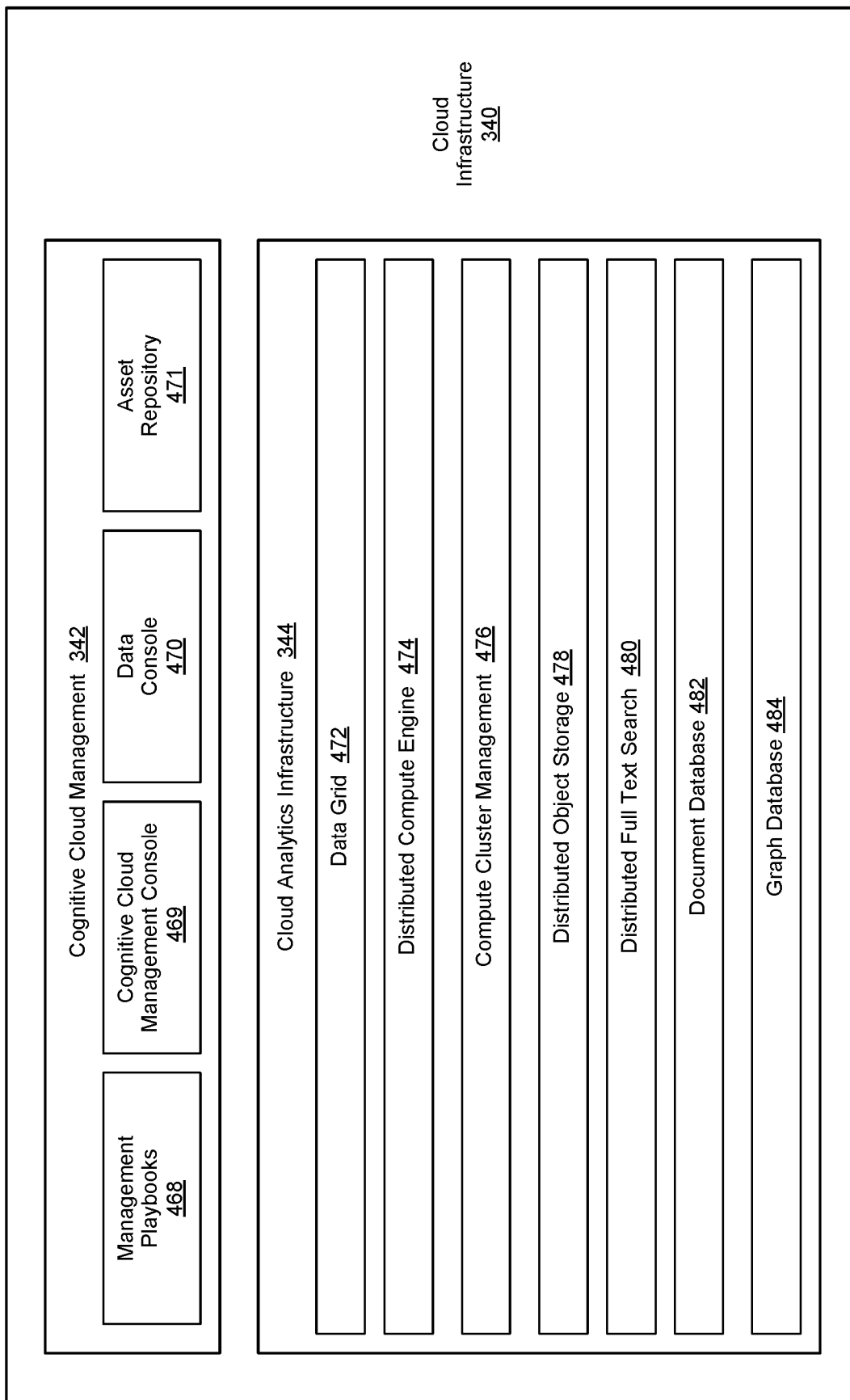

FIGS. 4a through 4c depict additional cognitive inference and learning system (CILS) components implemented in accordance with an embodiment of the CILS reference model shown in FIG. 3. In this embodiment, the CILS reference model includes client applications 302, application accelerators 306, a cognitive platform 310, and cloud infrastructure 340. As shown in FIG. 4a, the client applications 302 include cognitive applications 304. In various embodiments, the cognitive applications 304 are implemented natively accept and understand human forms of communication, such as natural language text, audio, images, video, and so forth. In certain embodiments, the cognitive applications 304 may include healthcare 402, business performance 403, travel 404, and various other 405 applications familiar to skilled practitioners of the art. As such, the foregoing is only provided as examples of such cognitive applications 304 and is not intended to limit the intent, spirit of scope of the invention.

In various embodiments, the application accelerators 306 include a cognitive application framework 308. In certain embodiments, the application accelerators 308 and the cognitive application framework 308 support various plug-ins and components that facilitate the creation of client applications 302 and cognitive applications 304. In various embodiments, the application accelerators 306 include widgets, user interface (UI) components, reports, charts, and back-end integration components familiar to those of skill in the art. It will be appreciated that many such application accelerators 306 are possible and their provided functionality, selection, provision and support are a matter of design choice. As such, the application accelerators 306 described in greater detail herein are not intended to limit the spirit, scope or intent of the invention.

As shown in FIGS. 4a and 4b, the cognitive platform 310 includes a management console 312, a development environment 314, application program interfaces (APIs) 316, sourcing agents 318, a cognitive engine 320, destination agents 336, platform data 338, and a crawl framework 452. In various embodiments, the management console 312 is implemented to manage accounts and projects, along with management metadata 461 that is used to drive processes and operations within the cognitive platform 310 for a predetermined project.

In various embodiments, the management console 312 is implemented to run various services on the cognitive platform 310. In certain embodiments, the management console 312 is implemented to manage the configuration of the cognitive platform 310. In certain embodiments, the management console 312 is implemented to establish the development environment 314. In various embodiments, the management console 312 may be implemented to manage the development environment 314 once it is established. Skilled practitioners of the art will realize that many such embodiments are possible and the foregoing is not intended to limit the spirit, scope or intent of the invention.

In various embodiments, the development environment 314 is implemented to create custom extensions to the CILS 118 shown in FIG. 2. In these and other embodiments, the development environment 314 is implemented to support various programming languages, such as Python, Java, R, and others familiar to skilled practitioners of the art. In various embodiments, the development environment 314 is implemented to allow one or more of these various programming languages to create a variety of analytic models and applications. As an example, the development environment 314 may be implemented to support the R programming language, which in turn can be used to create an analytic model that is then hosted on the cognitive platform 310.

In certain embodiments, the development environment 314 is implemented for the development of various custom applications or extensions related to the cognitive platform 310, which may subsequently be deployed in a public, private or hybrid cloud environment. In various embodiments, the development environment 314 is implemented for the development of various custom sourcing agents 318, custom enrichment agents 425, custom bridging agents 429, custom insight agents 433, custom destination agents 336, and custom learning agents 434, which are described in greater detail herein.

In various embodiments, the APIs 316 are implemented to build and manage predetermined cognitive applications 304, described in greater detail herein, which are then executed on the cognitive platform 310 to generate cognitive insights. In these embodiments, the APIs 316 may include one or more of a project and dataset API 408, a cognitive search API 409, a cognitive insight API 410, and other APIs. The selection of the individual APIs 316 implemented in various embodiments is a matter design choice and the foregoing is not intended to limit the spirit, scope or intent of the invention.

In various embodiments, the project and dataset API 408 is implemented with the management console 312 to enable the management of a variety of data and metadata associated with various cognitive insight projects and user accounts hosted or supported by the cognitive platform 310. In one embodiment, the data and metadata managed by the project and dataset API 408 are associated with billing information familiar to those of skill in the art. In one embodiment, the project and dataset API 408 is used to access a data stream that is created, configured and orchestrated, as described in greater detail herein, by the dataset engine 322.

In various embodiments, the cognitive search API 409 uses natural language processes familiar to those of skill in the art to search a target cognitive graph. Likewise, the cognitive insight API 410 is implemented in various embodiments to configure the insight/learning engine 330 to provide access to predetermined outputs from one or more cognitive graph algorithms that are executing in the cognitive platform 310. In certain embodiments, the cognitive insight API 410 is implemented to subscribe to, or request, such predetermined outputs.

In various embodiments, the sourcing agents 318 may include a batch upload 414 agent, an API connectors 415 agent, a real-time streams 416 agent, a Structured Query Language (SQL)/Not Only SQL (NoSQL) databases 417 agent, a message engines 418 agent, and one or more custom sourcing 420 agents. Skilled practitioners of the art will realize that other types of sourcing agents 318 may be used in various embodiments and the foregoing is not intended to limit the spirit, scope or intent of the invention. In various embodiments, the sourcing agents 318 are implemented to source a variety of multi-site, multi-structured source streams of data described in greater detail herein. In certain embodiments, each of the sourcing agents 318 has a corresponding API.

In various embodiments, the batch uploading 414 agent is implemented for batch uploading of data to the cognitive platform 310. In these embodiments, the uploaded data may include a single data element, a single data record or file, or a plurality of data records or files. In certain embodiments, the data may be uploaded from more than one source and the uploaded data may be in a homogenous or heterogeneous form. In various embodiments, the API connectors 415 agent is implemented to manage interactions with one or more predetermined APIs that are external to the cognitive platform 310. As an example, Associated Press® may have their own API for news stories, Expedia® for travel information, or the National Weather Service for weather information. In these examples, the API connectors 415 agent would be implemented to determine how to respectively interact with each organization's API such that the cognitive platform 310 can receive information.

In various embodiments, the real-time streams 416 agent is implemented to receive various streams of data, such as social media streams (e.g., Twitter feeds) or other data streams (e.g., device data streams). In these embodiments, the streams of data are received in near-real-time. In certain embodiments, the data streams include temporal attributes. As an example, as data is added to a blog file, it is time-stamped to create temporal data. Other examples of a temporal data stream include Twitter feeds, stock ticker streams, device location streams from a device that is tracking location, medical devices tracking a patient's vital signs, and intelligent thermostats used to improve energy efficiency for homes.

In certain embodiments, the temporal attributes define a time window, which can be correlated to various elements of data contained in the stream. For example, as a given time window changes, associated data may have a corresponding change. In various embodiments, the temporal attributes do not define a time window. As an example, a social media feed may not have predetermined time windows, yet it is still temporal. As a result, the social media feed can be processed to determine what happened in the last 24 hours, what happened in the last hour, what happened in the last 15 minutes, and then determine related subject matter that is trending.

In various embodiments, the SQL/NoSQL databases 417 agent is implemented to interact with one or more target databases familiar to those of skill in the art. For example, the target database may include a SQL, NoSQL, delimited flat file, or other form of database. In various embodiments, the message engines 418 agent is implemented to provide data to the cognitive platform 310 from one or more message engines, such as a message queue (MQ) system, a message bus, a message broker, an enterprise service bus (ESB), and so forth. Skilled practitioners of the art will realize that there are many such examples of message engines with which the message engines 418 agent may interact and the foregoing is not intended to limit the spirit, scope or intent of the invention.

In various embodiments, the custom sourcing agents 420, which are purpose-built, are developed through the use of the development environment 314, described in greater detail herein. Examples of custom sourcing agents 420 include sourcing agents for various electronic medical record (EMR) systems at various healthcare facilities. Such EMR systems typically collect a variety of healthcare information, much of it the same, yet it may be collected, stored and provided in different ways. In this example, the custom sourcing agents 420 allow the cognitive platform 310 to receive information from each disparate healthcare source.

In various embodiments, the cognitive engine 320 includes a dataset engine 322, a graph engine 326, an insight/learning engine 330, learning agents 434, and foundation components 334. In these and other embodiments, the dataset engine 322 is implemented as described in greater detail to establish and maintain a dynamic data ingestion and enrichment pipeline. In various embodiments, the dataset engine 322 may include a pipelines 422 component, an enrichment 423 component, a storage component 424, and one or more enrichment agents 425.

In various embodiments, the pipelines 422 component is implemented to ingest various data provided by the sourcing agents 318. Once ingested, this data is converted by the pipelines 422 component into streams of data for processing. In certain embodiments, these managed streams are provided to the enrichment 423 component, which performs data enrichment operations familiar to those of skill in the art. As an example, a data stream may be sourced from Associated Press® by a sourcing agent 318 and provided to the dataset engine 322. The pipelines 422 component receives the data stream and routes it to the enrichment 423 component, which then enriches the data stream by performing sentiment analysis, geotagging, and entity detection operations to generate an enriched data stream. In certain embodiments, the enrichment operations include filtering operations familiar to skilled practitioners of the art. To further the preceding example, the Associated Press® data stream may be filtered by a predetermined geography attribute to generate an enriched data stream.

The enriched data stream is then subsequently stored, as described in greater detail herein, in a predetermined location. In various embodiments, the enriched data stream is cached by the storage 424 component to provide a local version of the enriched data stream. In certain embodiments, the cached, enriched data stream is implemented to be "replayed" by the cognitive engine 320. In one embodiment, the replaying of the cached, enriched data stream allows incremental ingestion of the enriched data stream instead of ingesting the entire enriched data stream at one time. In various embodiments, one or more enrichment agents 425 are implemented to be invoked by the enrichment component 423 to perform one or more enrichment operations described in greater detail herein.

In various embodiments, the graph query engine 326 is implemented to receive and process queries such that they can be bridged into a cognitive graph, as described in greater detail herein, through the use of a bridging agent. In these embodiments, the graph query engine may include a query 426 component, a translate 427 component, a bridge 428 component, and one or more bridging agents 429.

In various embodiments, the query 426 component is implemented to support natural language queries. In these and other embodiments, the query 426 component receives queries, processes them (e.g., using NLP processes), and then maps the processed query to a target cognitive graph. In various embodiments, the translate 427 component is implemented to convert the processed queries provided by the query 426 component into a form that can be used to query a target cognitive graph. To further differentiate the distinction between the functionality respectively provided by the query 426 and translate 427 components, the query 426 component is oriented toward understanding a query from a user. In contrast, the translate 427 component is oriented to translating a query that is understood into a form that can be used to query a cognitive graph.

In various embodiments, the bridge 428 component is implemented to generate an answer to a query provided by the translate 427 component. In certain embodiments, the bridge 428 component is implemented to provide domain-specific responses when bridging a translated query to a cognitive graph. For example, the same query bridged to a target cognitive graph by the bridge 428 component may result in different answers for different domains, dependent upon domain-specific bridging operations performed by the bridge 428 component.

To further differentiate the distinction between the translate 427 component and the bridging 428 component, the translate 427 component relates to a general domain translation of a question. In contrast, the bridging 428 component allows the question to be asked in the context of a specific domain (e.g., healthcare, travel, etc.), given what is known about the data. In certain embodiments, the bridging 428 component is implemented to process what is known about the translated query, in the context of the user, to provide an answer that is relevant to a specific domain.

As an example, a user may ask, "Where should I eat today?" If the user has been prescribed a particular health regimen, the bridging 428 component may suggest a restaurant with a "heart healthy" menu. However, if the user is a business traveler, the bridging 428 component may suggest the nearest restaurant that has the user's favorite food. In various embodiments, the bridging 428 component may provide answers, or suggestions, that are composed and ranked according to a specific domain of use. In various embodiments, the bridging agent 429 is implemented to interact with the bridging component 428 to perform bridging operations described in greater detail herein. In these embodiments, the bridging agent interprets a translated query generated by the query 426 component within a predetermined user context, and then maps it to predetermined nodes and links within a target cognitive graph.

In various embodiments, the insight/learning engine 330 is implemented to encapsulate a predetermined algorithm, which is then applied to a target cognitive graph to generate a result, such as a cognitive insight or a recommendation. In certain embodiments, one or more such algorithms may contribute to answering a specific question and provide additional cognitive insights or recommendations. In these and other embodiments, the insight/learning engine 330 is implemented to perform insight/learning operations, described in greater detail herein. In various embodiments, the insight/learning engine 330 may include a discover/visibility 430 component, a predict 431 component, a rank/recommend 432 component, and one or more insight 433 agents.

In various embodiments, the discover/visibility 430 component is implemented to provide detailed information related to a predetermined topic, such as a subject or an event, along with associated historical information. In certain embodiments, the predict 431 component is implemented to perform predictive operations to provide insight into what may next occur for a predetermined topic. In various embodiments, the rank/recommend 432 component is implemented to perform ranking and recommendation operations to provide a user prioritized recommendations associated with a provided cognitive insight.

In certain embodiments, the insight/learning engine 330 may include additional components. For example the additional components may include classification algorithms, clustering algorithms, and so forth. Skilled practitioners of the art will realize that many such additional components are possible and that the foregoing is not intended to limit the spirit, scope or intent of the invention. In various embodiments, the insights agents 433 are implemented to create a visual data story, highlighting user-specific insights, relationships and recommendations. As a result, it can share, operationalize, or track business insights in various embodiments. In various embodiments, the learning agent 434 work in the background to continually update the cognitive graph, as described in greater detail herein, from each unique interaction with data and users.

In various embodiments, the destination agents 336 are implemented to publish cognitive insights to a consumer of cognitive insight data. Examples of such consumers of cognitive insight data include target databases, business intelligence applications, and mobile applications. In various embodiments, the destination agents 336 may include a Hypertext Transfer Protocol (HTTP) stream 440 agent, an API connectors 441 agent, a databases 442 agent, a message engines 443 agent, a mobile push notification 444 agent, and one or more custom destination 446 agents. Skilled practitioners of the art will realize that other types of destination agents 318 may be used in various embodiments and the foregoing is not intended to limit the spirit, scope or intent of the invention. In certain embodiments, each of the destination agents 318 has a corresponding API.

In various embodiments, the HTTP stream 440 agent is implemented for providing various HTTP streams of cognitive insight data to a predetermined cognitive data consumer. In these embodiments, the provided HTTP streams may include various HTTP data elements familiar to those of skill in the art. In certain embodiments, the HTTP streams of data are provided in near-real-time. In various embodiments, the API connectors 441 agent is implemented to manage interactions with one or more predetermined APIs that are external to the cognitive platform 310. As an example, various target databases, business intelligence applications, and mobile applications may each have their own unique API.

In various embodiments, the databases 442 agent is implemented for provision of cognitive insight data to one or more target databases familiar to those of skill in the art. For example, the target database may include a SQL, NoSQL, delimited flat file, or other form of database. In these embodiments, the provided cognitive insight data may include a single data element, a single data record or file, or a plurality of data records or files. In certain embodiments, the data may be provided to more than one cognitive data consumer and the provided data may be in a homogenous or heterogeneous form. In various embodiments, the message engines 443 agent is implemented to provide cognitive insight data to one or more message engines, such as a message queue (MQ) system, a message bus, a message broker, an enterprise service bus (ESB), and so forth. Skilled practitioners of the art will realize that there are many such examples of message engines with which the message engines 443 agent may interact and the foregoing is not intended to limit the spirit, scope or intent of the invention.

In various embodiments, the custom destination agents 420, which are purpose-built, are developed through the use of the development environment 314, described in greater detail herein. Examples of custom destination agents 420 include destination agents for various electronic medical record (EMR) systems at various healthcare facilities. Such EMR systems typically collect a variety of healthcare information, much of it the same, yet it may be collected, stored and provided in different ways. In this example, the custom destination agents 420 allow such EMR systems to receive cognitive insight data in a form they can use.

In various embodiments, data that has been cleansed, normalized and enriched by the dataset engine, as described in greater detail herein, is provided by a destination agent 336 to a predetermined destination, likewise described in greater detail herein. In these embodiments, neither the graph query engine 326 nor the insight/learning engine 330 are implemented to perform their respective functions.

In various embodiments, the foundation components 334 are implemented to enable the dataset engine 322, the graph query engine 326, and the insight/learning engine 330 to perform their respective operations and processes. In these and other embodiments, the foundation components 334 may include an NLP core 436 component, an NLP services 437 component, and a dynamic pipeline engine 438. In various embodiments, the NLP core 436 component is implemented to provide a set of predetermined NLP components for performing various NLP operations described in greater detail herein.

In these embodiments, certain of these NLP core components are surfaced through the NLP services 437 component, while some are used as libraries. Examples of operations that are performed with such components include dependency parsing, parts-of-speech tagging, sentence pattern detection, and so forth. In various embodiments, the NLP services 437 component is implemented to provide various internal NLP services, which are used to perform entity detection, summarization, and other operations, likewise described in greater detail herein. In these embodiments, the NLP services 437 component is implemented to interact with the NLP core 436 component to provide predetermined NLP services, such as summarizing a target paragraph.

In various embodiments, the dynamic pipeline engine 438 is implemented to interact with the dataset engine 322 to perform various operations related to receiving one or more sets of data from one or more sourcing agents, apply enrichment to the data, and then provide the enriched data to a predetermined destination. In these and other embodiments, the dynamic pipeline engine 438 manages the distribution of these various operations to a predetermined compute cluster and tracks versioning of the data as it is processed across various distributed computing resources. In certain embodiments, the dynamic pipeline engine 438 is implemented to perform data sovereignty management operations to maintain sovereignty of the data.

In various embodiments, the platform data 338 includes various data repositories, described in greater detail herein, that are accessed by the cognitive platform 310 to generate cognitive insights. In these embodiments, the platform data 338 repositories may include repositories of dataset metadata 456, cognitive graphs 457, models 459, crawl data 460, and management metadata 461. In various embodiments, the dataset metadata 456 is associated with curated data 458 contained in the repository of cognitive graphs 457. In these and other embodiments, the repository of dataset metadata 456 contains dataset metadata that supports operations performed by the storage 424 component of the dataset engine 322. For example, if a Mongo® NoSQL database with ten million items is being processed, and the cognitive platform 310 fails after ingesting nine million of the items, then the dataset metadata 456 may be able to provide a checkpoint that allows ingestion to continue at the point of failure instead restarting the ingestion process.

Those of skill in the art will realize that the use of such dataset metadata 456 in various embodiments allows the dataset engine 322 to be stateful. In certain embodiments, the dataset metadata 456 allows support of versioning. For example versioning may be used to track versions of modifications made to data, such as in data enrichment processes described in greater detail herein. As another example, geotagging information may have been applied to a set of data during a first enrichment process, which creates a first version of enriched data. Adding sentiment data to the same million records during a second enrichment process creates a second version of enriched data. In this example, the dataset metadata stored in the dataset metadata 456 provides tracking of the different versions of the enriched data and the differences between the two.

In various embodiments, the repository of cognitive graphs 457 is implemented to store cognitive graphs generated, accessed, and updated by the cognitive engine 320 in the process of generating cognitive insights. In various embodiments, the repository of cognitive graphs 457 may include one or more repositories of curated data 458, described in greater detail herein. In certain embodiments, the repositories of curated data 458 includes data that has been curated by one or more users, machine operations, or a combination of the two, by performing various sourcing, filtering, and enriching operations described in greater detail herein. In these and other embodiments, the curated data 458 is ingested by the cognitive platform 310 and then processed, as likewise described in greater detail herein, to generate cognitive insights. In various embodiments, the repository of models 459 is implemented to store models that are generated, accessed, and updated by the cognitive engine 320 in the process of generating cognitive insights. As used herein, models broadly refer to machine learning models. In certain embodiments, the models include one or more statistical models.

In various embodiments, the crawl framework 452 is implemented to support various crawlers 454 familiar to skilled practitioners of the art. In certain embodiments, the crawlers 454 are custom configured for various target domains. For example, different crawlers 454 may be used for various travel forums, travel blogs, travel news and other travel sites. In various embodiments, data collected by the crawlers 454 is provided by the crawl framework 452 to the repository of crawl data 460. In these embodiments, the collected crawl data is processed and then stored in a normalized form in the repository of crawl data 460. The normalized data is then provided to SQL/NoSQL database 417 agent, which in turn provides it to the dataset engine 322. In one embodiment, the crawl database 460 is a NoSQL database, such as Mongo®.

In various embodiments, the repository of management metadata 461 is implemented to store user-specific metadata used by the management console 312 to manage accounts (e.g., billing information) and projects. In certain embodiments, the user-specific metadata stored in the repository of management metadata 461 is used by the management console 312 to drive processes and operations within the cognitive platform 310 for a predetermined project. In various embodiments, the user-specific metadata stored in the repository of management metadata 461 is used to enforce data sovereignty. It will be appreciated that many such embodiments are possible and the foregoing is not intended to limit the spirit, scope or intent of the invention.

Referring now to FIG. 4c, the cloud infrastructure 340 may include a cognitive cloud management 342 component and a cloud analytics infrastructure 344 component in various embodiments. Current examples of a cloud infrastructure 340 include Amazon Web Services (AWS®), available from Amazon.com® of Seattle, Wash., IBM® Softlayer, available from International Business Machines of Armonk, N.Y., and Nebula/Openstack, a joint project between Raskspace Hosting®, of Windcrest, Tex., and the National Aeronautics and Space Administration (NASA). In these embodiments, the cognitive cloud management 342 component may include a management playbooks 468 sub-component, a cognitive cloud management console 469 sub-component, a data console 470 sub-component, an asset repository 471 sub-component. In certain embodiments, the cognitive cloud management 342 component may include various other sub-components.

In various embodiments, the management playbooks 468 sub-component is implemented to automate the creation and management of the cloud analytics infrastructure 344 component along with various other operations and processes related to the cloud infrastructure 340. As used herein, "management playbooks" broadly refers to any set of instructions or data, such as scripts and configuration data, that is implemented by the management playbooks 468 sub-component to perform its associated operations and processes.

In various embodiments, the cognitive cloud management console 469 sub-component is implemented to provide a user visibility and management controls related to the cloud analytics infrastructure 344 component along with various other operations and processes related to the cloud infrastructure 340. In various embodiments, the data console 470 sub-component is implemented to manage platform data 338, described in greater detail herein. In various embodiments, the asset repository 471 sub-component is implemented to provide access to various cognitive cloud infrastructure assets, such as asset configurations, machine images, and cognitive insight stack configurations.

In various embodiments, the cloud analytics infrastructure 344 component may include a data grid 472 sub-component, a distributed compute engine 474 sub-component, and a compute cluster management 476 sub-component. In these embodiments, the cloud analytics infrastructure 344 component may also include a distributed object storage 478 sub-component, a distributed full text search 480 sub-component, a document database 482 sub-component, a graph database 484 sub-component, and various other sub-components. In various embodiments, the data grid 472 sub-component is implemented to provide distributed and shared memory that allows the sharing of objects across various data structures. One example of a data grid 472 sub-component is Redis, an open-source, networked, in-memory, key-value data store, with optional durability, written in ANSI C. In various embodiments, the distributed compute engine 474 sub-component is implemented to allow the cognitive platform 310 to perform various cognitive insight operations and processes in a distributed computing environment. Examples of such cognitive insight operations and processes include batch operations and streaming analytics processes.

In various embodiments, the compute cluster management 476 sub-component is implemented to manage various computing resources as a compute cluster. One such example of such a compute cluster management 476 sub-component is Mesos/Nimbus, a cluster management platform that manages distributed hardware resources into a single pool of resources that can be used by application frameworks to efficiently manage workload distribution for both batch jobs and long-running services. In various embodiments, the distributed object storage 478 sub-component is implemented to manage the physical storage and retrieval of distributed objects (e.g., binary file, image, text, etc.) in a cloud environment. Examples of a distributed object storage 478 sub-component include Amazon S3®, available from Amazon.com of Seattle, Wash., and Swift, an open source, scalable and redundant storage system.

In various embodiments, the distributed full text search 480 sub-component is implemented to perform various full text search operations familiar to those of skill in the art within a cloud environment. In various embodiments, the document database 482 sub-component is implemented to manage the physical storage and retrieval of structured data in a cloud environment. Examples of such structured data include social, public, private, and device data, as described in greater detail herein. In certain embodiments, the structured data includes data that is implemented in the JavaScript Object Notation (JSON) format. One example of a document database 482 sub-component is Mongo, an open source cross-platform document-oriented database. In various embodiments, the graph database 484 sub-component is implemented to manage the physical storage and retrieval of cognitive graphs. One example of a graph database 484 sub-component is GraphDB, an open source graph database familiar to those of skill in the art.

Figure 5:
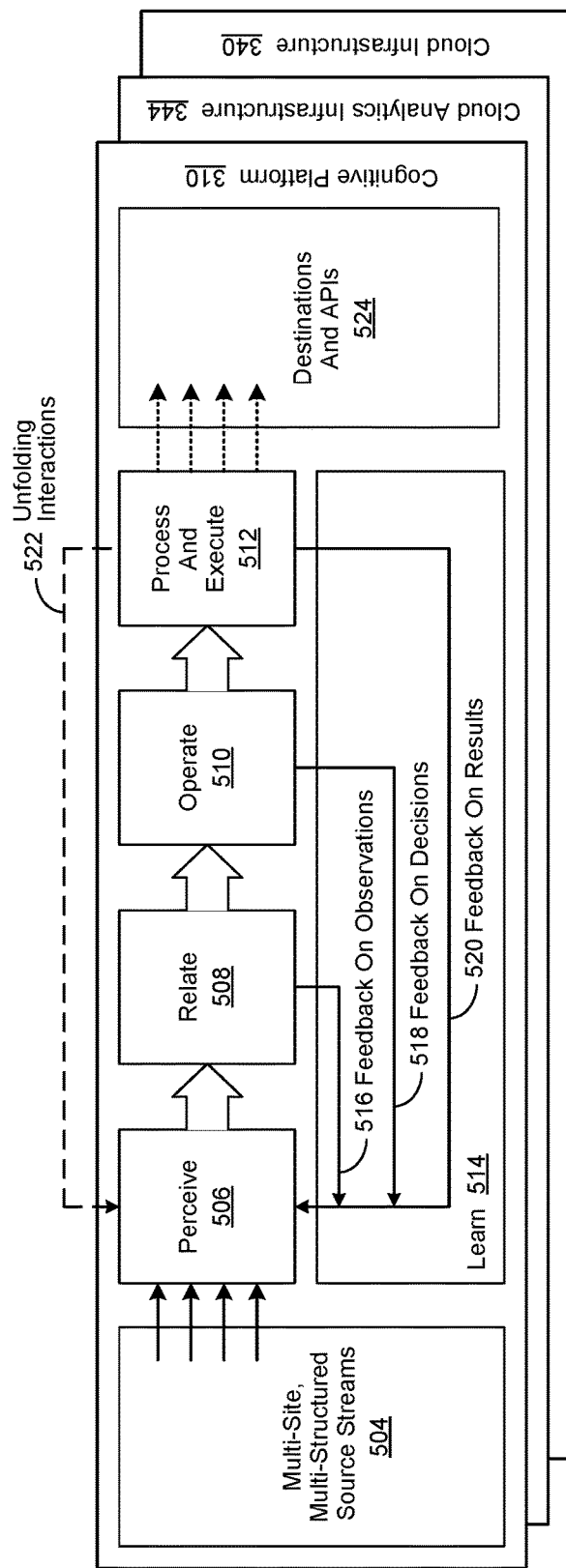
FIG. 5 is a simplified process diagram of CILS operations.

FIG. 5 is a simplified process diagram of cognitive inference and learning system (CILS) operations performed in accordance with an embodiment of the invention. In various embodiments, these CILS operations may include a perceive 506 phase, a relate 508 phase, an operate 510 phase, a process and execute 512 phase, and a learn 514 phase. In these and other embodiments, the CILS 118 shown in FIG. 2 is implemented to mimic cognitive processes associated with the human brain. In various embodiments, the CILS operations are performed through the implementation of a cognitive platform 310, described in greater detail herein. In these and other embodiments, the cognitive platform 310 may be implemented within a cloud analytics infrastructure 344, which in turn is implemented within a cloud infrastructure 340, likewise described in greater detail herein.

In various embodiments, multi-site, multi-structured source streams 504 are provided by sourcing agents, as described in greater detail herein. In these embodiments, the source streams 504 are dynamically ingested in real-time during the perceive 506 phase, and based upon a predetermined context, extraction, parsing, and tagging operations are performed on language, text and images contained in the source streams 504. Automatic feature extraction and modeling operations are then performed with the previously processed source streams 504 during the relate 508 phase to generate queries to identify related data (i.e., corpus expansion).

In various embodiments, operations are performed during the operate 510 phase to discover, summarize and prioritize various concepts, which are in turn used to generate actionable recommendations and notifications associated with predetermined plan-based optimization goals. The resulting actionable recommendations and notifications are then processed during the process and execute 512 phase to provide cognitive insights, such as recommendations, to various predetermined destinations and associated application programming interfaces (APIs) 524.

In various embodiments, features from newly-observed data are automatically extracted from user feedback during the learn 514 phase to improve various analytical models. In these embodiments, the learn 514 phase includes feedback on observations generated during the relate 508 phase, which is provided to the perceive 506 phase. Likewise, feedback on decisions resulting from operations performed during the operate 510 phase, and feedback on results resulting from operations performed during the process and execute 512 phase, are also provided to the perceive 506 phase.

In various embodiments, user interactions result from operations performed during the process and execute 512 phase. In these embodiments, data associated with the user interactions are provided to the perceive 506 phase as unfolding interactions 522, which include events that occur external to the CILS operations described in greater detail herein. As an example, a first query from a user may be submitted to the CILS system, which in turn generates a first cognitive insight, which is then provided to the user. In response, the user may respond by providing a first response, or perhaps a second query, either of which is provided in the same context as the first query. The CILS receives the first response or second query, performs various CILS operations, and provides the user a second cognitive insight. As before, the user may respond with a second response or a third query, again in the context of the first query. Once again, the CILS performs various CILS operations and provides the user a third cognitive insight, and so forth. In this example, the provision of cognitive insights to the user, and their various associated responses, results in unfolding interactions 522, which in turn result in a stateful dialog that evolves over time. Skilled practitioners of the art will likewise realize that such unfolding interactions 522, occur outside of the CILS operations performed by the cognitive platform 310.

Figure 6:
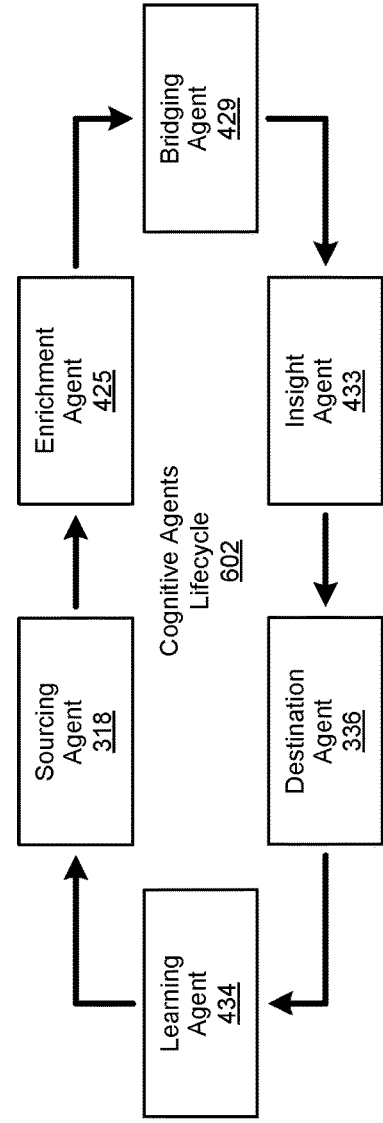
FIG. 6 depicts the lifecycle of CILS agents implemented to perform CILS operations.

FIG. 6 depicts the lifecycle of CILS agents implemented in accordance with an embodiment of the invention to perform CILS operations. In various embodiments, the CILS agents lifecycle 602 may include implementation of a sourcing 318 agent, an enrichment 425 agent, a bridging 429 agent, an insight 433 agent, a destination 336 agent, and a learning 434 agent. In these embodiments, the sourcing 318 agent is implemented to source a variety of multi-site, multi-structured source streams of data described in greater detail herein. These sourced data streams are then provided to an enrichment 425 agent, which then invokes an enrichment component to perform enrichment operations to generate enriched data streams, likewise described in greater detail herein.

The enriched data streams are then provided to a bridging 429 agent, which is used to perform bridging operations described in greater detail herein. In turn, the results of the bridging operations are provided to an insight 433 agent, which is implemented as described in greater detail herein to create a visual data story, highlighting user-specific insights, relationships and recommendations. The resulting visual data story is then provided to a destination 336 agent, which is implemented to publish cognitive insights to a consumer of cognitive insight data, likewise as described in greater detail herein. In response, the consumer of cognitive insight data provides feedback to a learning 434 agent, which is implemented as described in greater detail herein to provide the feedback to the sourcing agent 318, at which point the CILS agents lifecycle 602 is continued. From the foregoing, skilled practitioners of the art will recognize that each iteration of the cognitive agents lifecycle 602 provides more informed cognitive insights.

Figure 7:
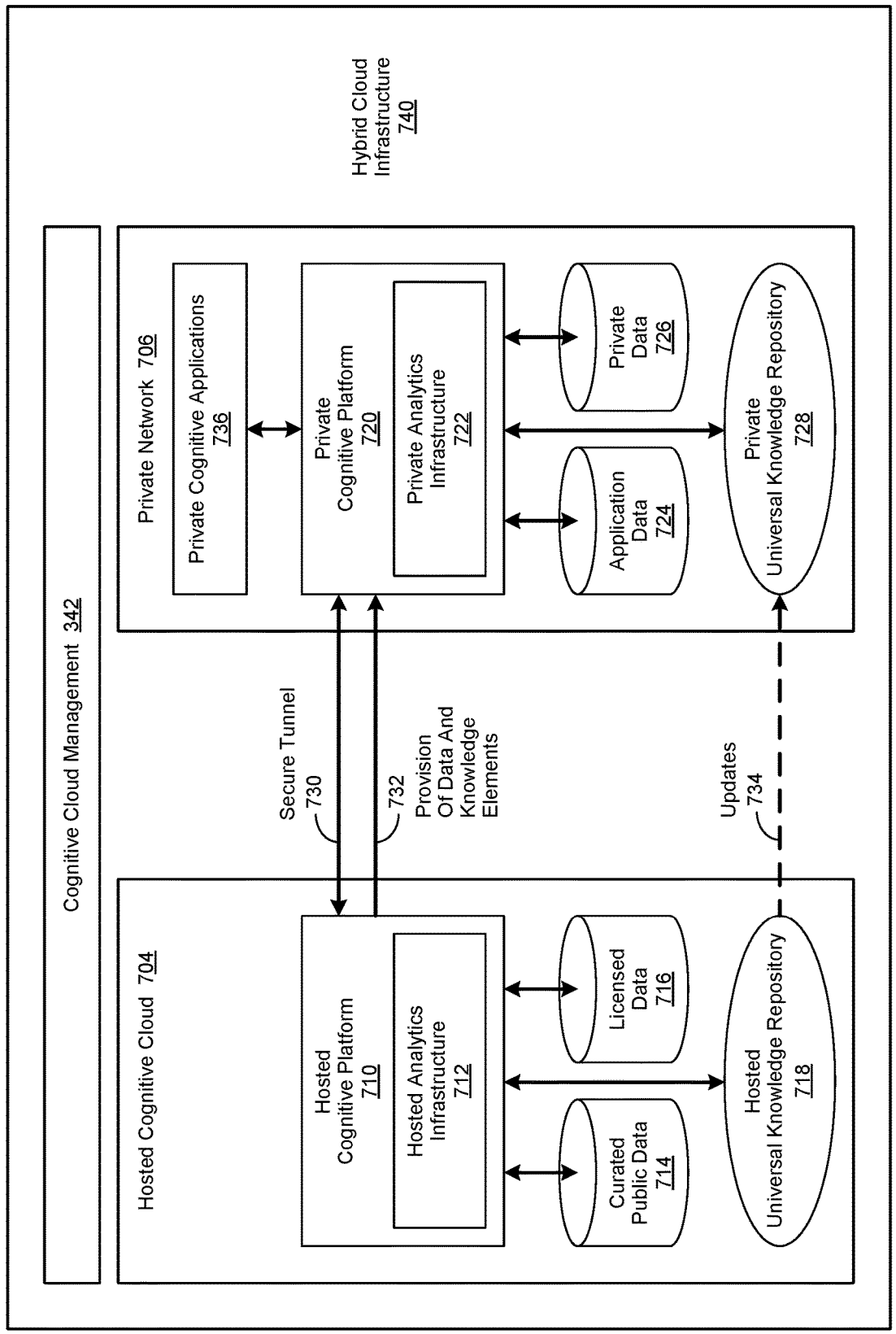
FIG. 7 is a simplified block diagram of a plurality of cognitive platforms implemented in a hybrid cloud environment.

FIG. 7 is a simplified block diagram of a plurality of cognitive platforms implemented in accordance with an embodiment of the invention within a hybrid cloud infrastructure. In this embodiment, the hybrid cloud infrastructure 740 includes a cognitive cloud management 342 component, a hosted 704 cognitive cloud environment, and a private 706 network environment. As shown in FIG. 7, the hosted 704 cognitive cloud environment includes a hosted 710 cognitive platform, such as the cognitive platform 310 shown in FIGS. 3, 4a, and 4b. In various embodiments, the hosted 704 cognitive cloud environment may also include a hosted 718 universal knowledge repository and one or more repositories of curated public data 714 and licensed data 716. Likewise, the hosted 710 cognitive platform may also include a hosted 712 analytics infrastructure, such as the cloud analytics infrastructure 344 shown in FIGS. 3 and 4c.

As likewise shown in FIG. 7, the private 706 network environment includes a private 720 cognitive platform, such as the cognitive platform 310 shown in FIGS. 3, 4a, and 4b. In various embodiments, the private 706 network cognitive cloud environment may also include a private 728 universal knowledge repository and one or more repositories of application data 724 and private data 726. Likewise, the private 720 cognitive platform may also include a private 722 analytics infrastructure, such as the cloud analytics infrastructure 344 shown in FIGS. 3 and 4c. In certain embodiments, the private 706 network environment may have one or more private 736 cognitive applications implemented to interact with the private 720 cognitive platform.

As used herein, a universal knowledge repository broadly refers to a collection of knowledge elements that can be used in various embodiments to generate one or more cognitive insights described in greater detail herein. In various embodiments, these knowledge elements may include facts (e.g., milk is a dairy product), information (e.g., an answer to a question), descriptions (e.g., the color of an automobile), skills (e.g., the ability to install plumbing fixtures), and other classes of knowledge familiar to those of skill in the art. In these embodiments, the knowledge elements may be explicit or implicit. As an example, the fact that water freezes at zero degrees centigrade would be an explicit knowledge element, while the fact that an automobile mechanic knows how to repair an automobile would be an implicit knowledge element.

In certain embodiments, the knowledge elements within a universal knowledge repository may also include statements, assertions, beliefs, perceptions, preferences, sentiments, attitudes or opinions associated with a person or a group. As an example, user 'A' may prefer the pizza served by a first restaurant, while user 'B' may prefer the pizza served by a second restaurant. Furthermore, both user 'A' and 'B' are firmly of the opinion that the first and second restaurants respectively serve the very best pizza available. In this example, the respective preferences and opinions of users 'A' and 'B' regarding the first and second restaurant may be included in the universal knowledge repository 880 as they are not contradictory. Instead, they are simply knowledge elements respectively associated with the two users and can be used in various embodiments for the generation of various cognitive insights, as described in greater detail herein.

In various embodiments, individual knowledge elements respectively associated with the hosted 718 and private 728 universal knowledge repositories may be distributed. In one embodiment, the distributed knowledge elements may be stored in a plurality of data stores familiar to skilled practitioners of the art. In this embodiment, the distributed knowledge elements may be logically unified for various implementations of the hosted 718 and private 728 universal knowledge repositories. In certain embodiments, the hosted 718 and private 728 universal knowledge repositories may be respectively implemented in the form of a hosted or private universal cognitive graph. In these embodiments, nodes within the hosted or private universal graph contain one or more knowledge elements.

In various embodiments, a secure tunnel 730, such as a virtual private network (VPN) tunnel, is implemented to allow the hosted 710 cognitive platform and the private 720 cognitive platform to communicate with one another. In these various embodiments, the ability to communicate with one another allows the hosted 710 and private 720 cognitive platforms to work collaboratively when generating cognitive insights described in greater detail herein. In various embodiments, the hosted 710 cognitive platform accesses knowledge elements stored in the hosted 718 universal knowledge repository and data stored in the repositories of curated public data 714 and licensed data 716 to generate various cognitive insights. In certain embodiments, the resulting cognitive insights are then provided to the private 720 cognitive platform, which in turn provides them to the one or more private cognitive applications 736.

In various embodiments, the private 720 cognitive platform accesses knowledge elements stored in the private 728 universal knowledge repository and data stored in the repositories of application data 724 and private data 726 to generate various cognitive insights. In turn, the resulting cognitive insights are then provided to the one or more private cognitive applications 736. In certain embodiments, the private 720 cognitive platform accesses knowledge elements stored in the hosted 718 and private 728 universal knowledge repositories and data stored in the repositories of curated public data 714, licensed data 716, application data 724 and private data 726 to generate various cognitive insights. In these embodiments, the resulting cognitive insights are in turn provided to the one or more private cognitive applications 736.

In various embodiments, the secure tunnel 730 is implemented for the hosted 710 cognitive platform to provide 732 predetermined data and knowledge elements to the private 720 cognitive platform. In one embodiment, the provision 732 of predetermined knowledge elements allows the hosted 718 universal knowledge repository to be replicated as the private 728 universal knowledge repository. In another embodiment, the provision 732 of predetermined knowledge elements allows the hosted 718 universal knowledge repository to provide updates 734 to the private 728 universal knowledge repository. In certain embodiments, the updates 734 to the private 728 universal knowledge repository do not overwrite other data. Instead, the updates 734 are simply added to the private 728 universal knowledge repository.

In one embodiment, knowledge elements that are added to the private 728 universal knowledge repository are not provided to the hosted 718 universal knowledge repository. As an example, an airline may not wish to share private information related to its customer's flights, the price paid for tickets, their awards program status, and so forth. In another embodiment, predetermined knowledge elements that are added to the private 728 universal knowledge repository may be provided to the hosted 718 universal knowledge repository. As an example, the operator of the private 720 cognitive platform may decide to license predetermined knowledge elements stored in the private 728 universal knowledge repository to the operator of the hosted 710 cognitive platform. To continue the example, certain knowledge elements stored in the private 728 universal knowledge repository may be anonymized prior to being provided for inclusion in the hosted 718 universal knowledge repository. In one embodiment, only private knowledge elements are stored in the private 728 universal knowledge repository. In this embodiment, the private 720 cognitive platform may use knowledge elements stored in both the hosted 718 and private 728 universal knowledge repositories to generate cognitive insights. Skilled practitioners of the art will recognize that many such embodiments are possible and the foregoing is not intended to limit the spirit, scope or intent of the invention.

Figure 8:
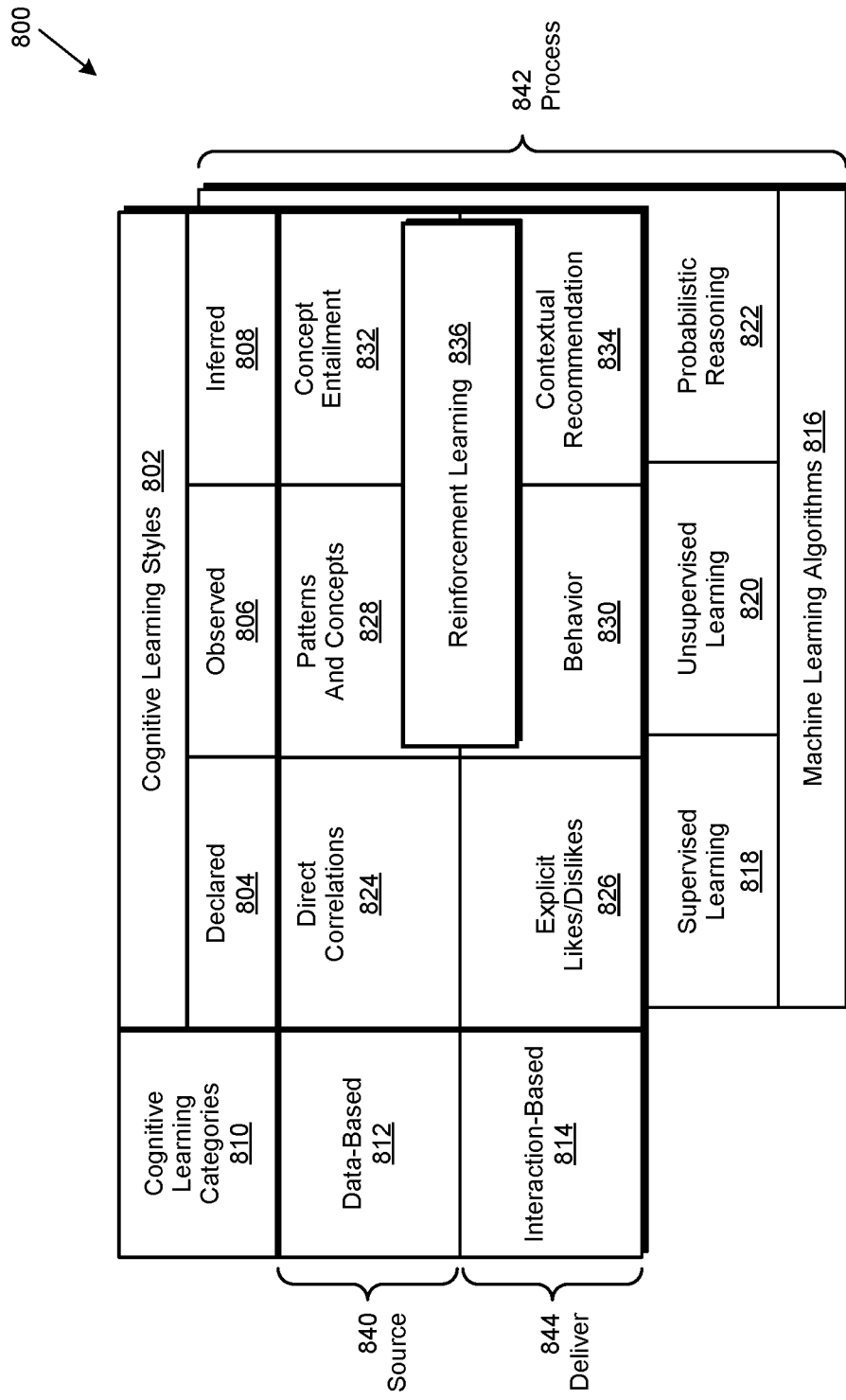
FIG. 8 depicts a cognitive learning framework.

FIG. 8 depicts a cognitive learning framework implemented in accordance with an embodiment of the invention to perform cognitive learning operations. As used herein, a cognitive learning operation broadly refers to the implementation of a cognitive learning technique, described in greater detail herein, to generate a cognitive learning result. In various embodiments, the implementation of the learning technique is performed by a Cognitive Inference and Learning System (CILS), likewise described in greater detail herein.

In certain embodiments, the cognitive learning result is used by the CILS to update a knowledge model, described in greater detail herein. In various embodiments, the knowledge model is implemented as a universal knowledge repository, such as the hosted 718 and private 728 universal knowledge repositories depicted in FIG. 7, or the universal knowledge repositories 918 and 1080 respectively depicted in FIGS. 9 and 10a. In certain embodiments, the knowledge model is implemented as a cognitive graph.

In various embodiments, the cognitive learning framework 800 may include various cognitive learning styles 802 and cognitive learning categories 810. As used herein, a cognitive learning style broadly refers to a generalized learning approach implemented by a CILS to perform a cognitive learning operation. In various embodiments, the cognitive learning styles 802 may include a declared 804 cognitive learning style, an observed 806 cognitive learning style, and an inferred 808 cognitive learning style.

As used herein, a declared 804 cognitive learning style broadly refers to the use of declarative data by a CILS to perform a corresponding cognitive learning operation. In various embodiments, the declarative data may be processed by the CILS as a statement, an assertion, or a verifiable fact. For example, an electronic medical record (EMR) may contain declarative data asserting that John Smith has Type 1 diabetes, which is a verifiable fact. As another example, a user may explicitly make a declarative statement that they do not like sushi.

Likewise, as used herein, an observed 806 cognitive learning style broadly refers to the use of observed data by CILS to perform a corresponding cognitive learning operation. In various embodiments, the observed data may include a pattern, a concept, or some combination thereof. As an example, a CILS may receive and process a stream of information, and over time, observe the formation of a discernable pattern, such as a user always ordering Chinese or Thai food for delivery at lunchtime. In this example, the discerned pattern of the user's ordering behavior may correspond to the concept that the user's lunchtime food preference is Asian cuisine.

In certain embodiments, a concept may include an observation of the use of certain words in a particular context. For example, the use of the word "haircut" in a financial text may refer to the difference between the market value of an asset used as loan collateral and the amount of the loan, as opposed to a service performed by a hair stylist. In this example, natural language processing (NLP) approaches known to those of skill in the art are implemented by the CILS during the performance of cognitive learning operations to determine the context in which the word "haircut" is used.

As likewise used herein, an inferred 808 cognitive learning style broadly refers to the use of inferred data by a CILS to perform a corresponding cognitive learning operation. In various embodiments the inferred data may include data inferred from the processing of source data. In certain embodiments, the inferred data may include concepts that are inferred from the processing of other concepts. In these embodiments, the inferred data resulting from the processing of the source data, the concepts, or a combination thereof, may result in the provision of new information that was not in the source data or other concepts.

As an example, a user's selection of a particular accommodation in a resort area during a holiday may result in an inference they prefer staying at a bed and breakfast while on personal travel. Likewise, the selection of a four star accommodation in a downtown area on a weekday may result in an inference the same user prefers a luxury hotel while on business travel. In this example, the user may not declaratively state an accommodation preference for a given type of travel. Likewise, there may be insufficient data to observe a particular accommodation preference, regardless of the type of travel.

In various embodiments, each of the cognitive learning styles 802 may be associated with the use of a set of processing resources to perform a corresponding cognitive learning operation. As an example, the observed 806 cognitive learning style may require more, or different, processing resources than the declared 804 cognitive learning style. Likewise, the inferred 808 cognitive learning style may require more, or different, processing resources than either the declared 804 or observed 806 cognitive learning styles. The particular resources used by each of cognitive learning styles 802 is a matter of design choice.

As used herein, a cognitive learning category 810 broadly refers to a source of information used by a CILS to perform cognitive learning operations. In various embodiments, the cognitive learning categories 810 may include a data-based 812 cognitive learning category and an interaction-based 814 cognitive learning category. As used herein, a data-based 812 cognitive learning category broadly refers to the use of data as a source of information in the performance of a cognitive learning operation by a CILS.

In various embodiments, the data may be provided to the CILS in real-time, near real-time, or batch mode as it is performing cognitive learning operations. In certain embodiments, the data may be provided to the CILS as a result of a query generated by the CILS. In various embodiments, the data is provided to the CILS by a cognitive agent, described in greater detail herein. In one embodiment, the cognitive agent is a learning agent, likewise described in greater detail herein.

In certain embodiments, the data may be multi-structured data. In these embodiments, the multi-structured data may include unstructured data (e.g., a document), semi-structured data (e.g., a social media post), and structured data (e.g., a string, an integer, etc.), such as data stored in a relational database management system (RDBMS). In various embodiments, the data may be public, private, or a combination thereof. In certain embodiments the data may be provided by a device, stored in a data lake, a data warehouse, or some combination thereof.

As likewise used herein, an interaction-based 814 cognitive learning category broadly refers to the use of one or more results of an interaction as a source of information used by a CILS to perform a cognitive learning operation. In various embodiments, the interaction may be between any combination of devices, applications, services, processes, or users. In certain embodiments, the results of the interaction may be provided in the form of feedback data to the CILS.

In various embodiments, the interaction may be explicitly or implicitly initiated by the provision of input data to the devices, applications, services, processes or users. In certain embodiments, the input data may be provided in response to a composite cognitive insight provided by a CILS. In one embodiment, the input data may include a user gesture, such as a key stroke, mouse click, finger swipe, or eye movement. In another embodiment, the input data may include a voice command from a user. In yet another embodiment, the input data may include data associated with a user, such as biometric data (e.g., retina scan, fingerprint, body temperature, pulse rate, etc.).

In yet still another embodiment, the input data may include environmental data (e.g., current temperature, etc.), location data (e.g., geographical positioning system coordinates, etc.), device data (e.g., telemetry data, etc.), or other data provided by a device, application, service, process or user. Those of skill in the art will realize that many such embodiments of cognitive learning styles 802 and cognitive learning categories 810 are possible, and the foregoing is not intended to limit the spirit, scope or intent of the invention.

As used herein, a cognitive learning technique refers to the use of a cognitive learning style, in combination with a cognitive learning category, to perform a cognitive learning operation. In various embodiments, individual cognitive learning techniques associated with a primary cognitive learning style are respectively bounded by an associated primary cognitive learning category. For example, as shown in FIG. 8, the direct correlations 824 and explicit likes/dislikes 826 cognitive learning techniques are both associated with the declared 804 learning style and respectively bounded by the data-based 812 and interaction-based 808 cognitive learning categories.

As likewise shown in FIG. 8, the patterns and concepts 828 and behavior 830 cognitive learning techniques are both associated with the observed 806 cognitive learning style and likewise respectively bounded by the data-based 812 and interaction-based 814 cognitive learning categories. Likewise, as shown in FIG. 8, the concept entailment 832 and contextual recommendation 834 cognitive learning techniques are both associated with the inferred 808 cognitive learning style and likewise respectively bounded by the data-based 812 and interaction-based 814 cognitive learning categories.

As used herein, a direct correlations 824 cognitive learning technique broadly refers to the implementation of a declared 804 cognitive learning style, bounded by a data-based 812 cognitive learning category, to perform cognitive learning operations related to direct correlations. Examples of direct correlation include statistical relationships involving dependence, such as the correlation between the stature or other physical characteristics of parents and their biological offspring. Another example of direct correlation would be the correlation between the resulting demand for a product offered at a price in a corresponding geographic market.

As yet another example, a spreadsheet may contain three columns of data, none of which have an associated column header. The first and second columns may contain names and the third column may contain dates. In this example, the first column may include names that are commonly used as first names (e.g., Bob, Mary, etc.) and the second column may include names that are commonly used as last names (e.g., Smith, Jones, etc.). As a result, there is a statistical likelihood that the third column may contain birthdates that directly correlate to the first and last names in the first and second columns.

As used herein, an explicit likes/dislikes 824 cognitive learning technique broadly refers to the implementation of a declared 812 cognitive learning style, bounded by an interaction-based 806 cognitive learning category, to perform cognitive learning operations related to a user's explicit likes/dislikes. In various embodiments, a user's explicit likes/dislikes may be declaratively indicated through the receipt of user input data, described in greater detail herein.

For example, an online shopper may select a first pair of shoes that are available in a white, black and brown. The user then elects to view a larger photo of the first pair of shoes, first in white, then in black, but not brown. To continue the example, the user then selects a second pair of shoes that are likewise available in white, black and brown. As before, the user elects to view a larger photo of the second pair of shoes, first in white, then in black, but once again, not brown. In this example, the user's online interaction indicates an explicit like for white and black shoes and an explicit dislike for brown shoes.

As used herein, a patterns and concepts 828 cognitive learning technique broadly refers to the implementation of an observed 812 cognitive learning style, bounded by a data-based 804 cognitive learning category, to perform cognitive learning operations related to the observation of patterns and concepts. As an example, a database record may include information related to various credit card transactions associated with a user. In this example, a pattern may be observed within the credit card transactions that the user always uses rental cars when traveling between cities in California, but always uses trains when traveling between cities in New York, New Jersey, or Pennsylvania. By extension, this pattern may correspond to a concept that the user prefers automobile transportation when traveling between cities on the West coast, but prefers train transportation when traveling between cities on the East coast.

As another example, a CILS may receive and process a stream of information, and over time, observe the formation of a discernable pattern, such as a user always selecting an Italian restaurant when searching online for nearby places to eat. To continue the example, the CILS may observe that the user consistently orders a Neapolitan pizza from a particular Italian restaurant when location data received from their mobile device indicates the user is in close proximity to the restaurant every Thursday. In this example, the discerned pattern of the user's behavior in consistently ordering a Neapolitan pizza from a particular restaurant when in close proximity on Thursdays may correspond to the concept that the user's food preference on Thursdays is Italian cuisine.

As used herein, a behavior 830 cognitive learning technique broadly refers to the implementation of an observed 812 cognitive learning style, bounded by an interaction-based 808 cognitive learning category, to perform cognitive learning operations related to observed behaviors. In various embodiments, the observed behavior associated with an interaction corresponds to various input data, likewise described in greater detail herein. In certain embodiments, the observed behaviors may include observed behavior associated with interactions, described in greater detail herein.

For example, a user may consistently place an online order for Mexican, Thai or Indian food to be delivered to their home in the evening. To continue the example, promotional offers for fried chicken or seafood are consistently ignored in the evening, yet consistently accepted at lunchtime. Furthermore, the observed behavior of the user is to accept the promotional offer that provides the most food at the lowest cost. In this example, the user's observed online behavior indicates a preference for spicy food in the evenings, regardless of price. Likewise, the user's observed only behavior may indicate a preference for low cost, non-spicy foods for lunch.

As used herein, a concept entailment 832 cognitive learning technique broadly refers to the implementation of an inferred 808 cognitive learning style, bounded by a data-based 804 cognitive learning category, to perform cognitive learning operations related to concept entailment. As likewise used herein, concept entailment broadly refers to the concept of understanding language, within the context of one piece of information being related to another. For example, if a statement is made that implies 'x', and 'x is known to imply 'y', then by extension, the statement may imply 'y' as well. In this example, there is a chaining of evidence between the statement, 'x', and 'y' that may result in a conclusion supported by the chain of evidence. As another example, based upon the study of philosophy, the statement that Socrates is a person, and all people are mortal, then the implication is that Socrates is mortal.

As yet another example, psycho-social healthcare notes associated with a special needs child may include information resulting from a care provider interviewing various family members. In this example, the concept entailment 832 cognitive learning technique may be used by the CILS to process the notes. As a result, a set of risk factors, such as transportation challenges, education situations, the potential for domestic abuse, and so forth, may be inferred that were not in the original notes.

To continue the example, if the mother of a special needs child makes a statement that the family car is broken, then the statement implies that there may be a transportation issue. By extension, a transportation issue may imply that the mother may be unable to get the child to the healthcare facility. Further, the inability of the child to get to the healthcare facility may imply missing an appointment, which in turn may imply that the child may not receive the care they have been prescribed. Taking the example one step further, if the child misses their appointment, not only would they not receive their prescribed care, but healthcare resources may not be used as optimally as possible.

As used herein, a contextual recommendation 834 cognitive learning technique broadly refers to the implementation of an inferred 808 cognitive learning style, bounded by an interaction-based 814 cognitive learning category, to perform cognitive learning operations related to contextual recommendations provided to a user. As likewise used herein, a contextual recommendation broadly refers to a recommendation made to a user based upon a context.

As an example, a user may perform an online search for a casual, affordable restaurant that is nearby. To continue the example, the user is currently on a low-sodium, gluten-free diet that has been prescribed by their healthcare provider. Additionally, the healthcare provider has recommended that the user walk at least two miles every day. To further continue the example, there may be five casual, affordable restaurants that are in close proximity to the location coordinates provided by the user's mobile device, all of which are presented to the user for consideration.

In response, the user further requests distance information to each of the restaurants, followed by a request to show only those restaurants offering low-sodium, gluten free menu items. As a result of the user interaction, the CILS responds with directions to the only restaurant offering low-sodium, gluten-free dishes. Further, the CILS may recommend the user try a Mediterranean dish, as past interactions has indicated that the user enjoys Mediterranean cuisine. In this example, the contextual recommendation is inferred from a series of interactions with the user.

As a continuation of a prior example, a special needs child may have an appointment at a healthcare facility for a prescribed procedure. However, there is a transportation issue, due to the family automobile being broken. In this example, the inference is the child will miss their appointment unless alternative transportation is arranged. Continuing the example, a contextual recommendation may be made to ask the healthcare facility to provide alternative transportation at their expense, which could then be interactively offered to the patient's mother, who in turn may accept the offer.

In various embodiments, machine learning algorithms 816 are respectively implemented with a cognitive learning technique by a CILS when performing cognitive learning operations. In one embodiment, a supervised learning 818 machine learning algorithm may be implemented with a direct correlations 824 cognitive learning technique, an explicit likes/dislikes 826 cognitive learning technique, or both.

In another embodiment, an unsupervised learning 820 machine learning algorithm may be implemented with a patterns and concepts 828 cognitive learning technique, a behavior 830 cognitive learning technique, or both. In yet another embodiment, a probabilistic reasoning 822 machine learning algorithm may be implemented with a concept entailment 832 cognitive learning technique, a contextual recommendation 834 cognitive learning technique, or both. Skilled practitioners of the art will recognize that many such embodiments are possible and the foregoing is not intended to limit the spirit, scope or intent of the invention.

As used herein, a supervised learning 818 machine learning algorithm broadly refers to a machine learning approach for inferring a function from labeled training data. The training data typically consists of a set of training examples, with each example consisting of an input object (e.g., a vector) and a desired output value (e.g., a supervisory signal). In various embodiments, a supervised learning algorithm is implemented to analyze the training data and produce an inferred function, which can be used for mapping new examples.

As used herein, an unsupervised learning 820 machine learning algorithm broadly refers to a machine learning approach for finding non-obvious or hidden structures within a set of unlabeled data. In various embodiments, the unsupervised learning 820 machine learning algorithm is not given a set of training examples. Instead, it attempts to summarize and explain key features of the data it processes. Examples of unsupervised learning approaches include clustering (e.g., k-means, mixture models, hierarchical clustering, etc.) and latent variable models (e.g., expectation-maximization algorithms, method of moments, blind signal separation techniques, etc.).

As used herein, a probabilistic reasoning 822 machine learning algorithm broadly refers to a machine learning approach that combines the ability of probability theory to handle uncertainty with the ability of deductive logic to exploit structure. More specifically, probabilistic reasoning attempts to find a natural extension of traditional logic truth tables. The results they define are derived through probabilistic expressions instead.

In various embodiments, reinforcement learning 836 approaches are implemented by a CILS in combination with a patterns and concepts 828, a behavior 830, a concept entailment 832, or a contextualization recommendation 834 cognitive learning technique when performing cognitive learning operations. As used herein, reinforcement learning broadly refers to machine learning approaches inspired by behaviorist psychology, where software agents take actions within an environment to maximize a notion of cumulative reward. Those of skill in the art will be familiar with such reinforcement approaches, which are commonly used in game theory, control theory, operations research, information theory, simulation-based optimization, multi-agent systems, swarm intelligence, statistics, and genetic algorithms.

In various embodiments, a particular cognitive learning technique may include the implementation of certain aspects of a secondary cognitive learning style, aspects of a secondary learning category, or a combination thereof. As an example, the patterns and concepts 828 cognitive learning technique may include implementation of certain aspects of the direct correlations 824 and concept entailment 832 cognitive learning techniques, and by extension, implementation of certain aspects of the declared 804 and inferred 808 cognitive learning styles.

As another example, the explicit likes/dislikes 826 cognitive learning technique may include implementation of certain aspects of the direct correlations 824 learning technique, and by extension, implementation of certain aspects of the declared 804 cognitive learning style. As yet another example, the behavior 830 cognitive learning technique may include certain aspects of both the patterns an concepts 828 and explicit likes/dislikes 826 cognitive learning techniques, and by extension, implementation of certain aspects the data-based 812 cognitive learning category. Skilled practitioners of art will recognize that many such examples are possible and the foregoing is not intended to limit the spirit, scope or intent of the invention.

In various embodiments, the data-based 812 cognitive learning category, machine learning algorithms 818, and the interaction-based 814 cognitive learning category are respectively associated with the source 840, process 842 and deliver 844 steps of a cognitive learning process. As used herein, a cognitive learning process broadly refers to a series of cognitive learning steps performed by a CILS to generate a cognitive learning result.

As likewise used herein, a source 840 step of a cognitive learning process broadly refers to operations associated with the acquisition of data used by a CILS to perform a cognitive learning operation. Likewise, as used herein, a process 842 step of a cognitive learning process broadly refers to the use of individual machine learning algorithms 816 by a CILS to perform cognitive learning operations. As likewise used herein, a deliver 844 step of a cognitive learning process broadly refers to the delivery of a cognitive insight, which results in an interaction, described in greater detail herein. Information related to, or resulting from, the interaction is then used by a CILS to perform cognitive learning operations.

In various embodiments, the cognitive insight is delivered to a device, an application, a service, a process, a user, or a combination thereof. In certain embodiments, the resulting interaction information is likewise received by a CILS from a device, an application, a service, a process, a user, or a combination thereof. In various embodiments, the resulting interaction information is provided in the form of feedback data to the CILS. In these embodiments, the method by which the cognitive learning process, and its associated cognitive learning steps, is implemented is a matter of design choice. Skilled practitioners of the art will recognize that many such embodiments are possible and the foregoing is not intended to limit the spirit, scope or intent of the invention.

Figure 9:
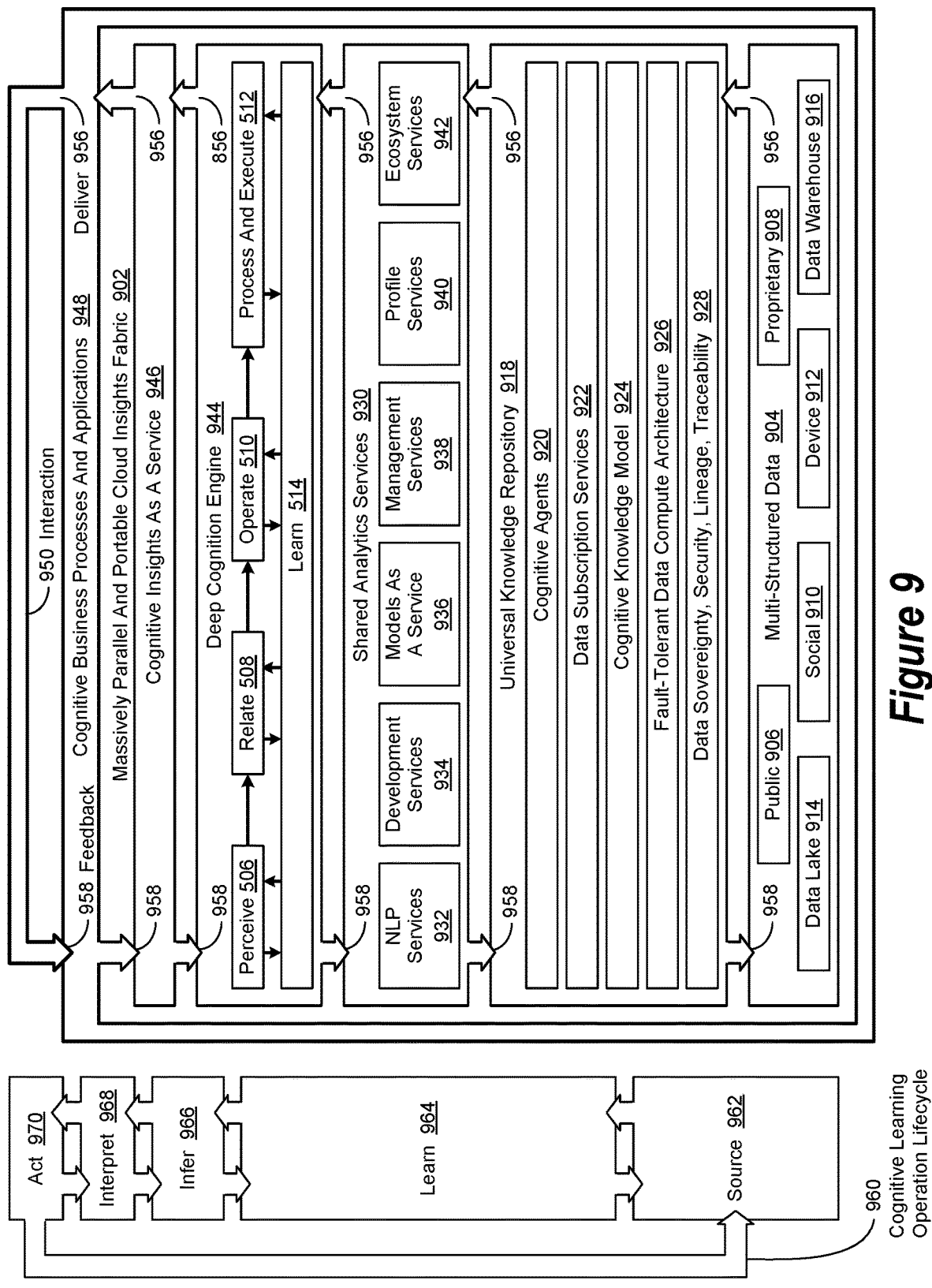
FIG. 9 is a simplified block diagram of a CILS used to manage the performance of cognitive learning operations throughout their lifecycle.

FIG. 9 is a simplified block diagram of a Cognitive Learning and Inference System (CILS) implemented in accordance with an embodiment of the invention to manage the performance of cognitive learning operations throughout their lifecycle. In various embodiments, individual elements of a CILS are implemented within a massively parallel and portable cloud insights fabric 902. In this embodiment, the individual elements of the CILS include repositories of multi-structured data 904, a universal knowledge repository 918, various shared analytics services 930, a deep cognition engine 944, and a cognitive insights as a service 946 module.

In various embodiments, the repositories of multi-structured data 904 may include public 906, proprietary 908, social 910, device 912, and other types of data. Examples of such data include emails, social media feeds, news feeds, blogs, doctor's notes, transaction records, call logs, and device telemetry streams. In these embodiments, the repositories of multi-structured data 904 may include unstructured data (e.g., a document), semi-structured data (e.g., a social media post), and structured data (e.g., a string, an integer, etc.), such as data stored in a relational database management system (RDBMS). In various embodiments, such data may be stored in a data lake 914, a data warehouse 916, or some combination thereof.

As shown in FIG. 9, the universal knowledge repository 918 includes various cognitive agents 920, described in greater detail herein, data subscription services 922, and a cognitive knowledge model 924. In certain embodiments, the cognitive agents 920 include a learning agent. As likewise shown in FIG. 9, the universal knowledge repository also includes a fault-tolerant data compute architecture 926, familiar to those of skill in the art, and a data sovereignty, security, lineage and traceability system 928.

In various embodiments, individual data subscription services 922 are implemented to deliver 956 data on an event-driven basis to the various shared analytics services 930. In these embodiments, the data provided to the shared analytics services 930 is retrieved from the cognitive knowledge model 924. In various embodiments, the cognitive knowledge model 924 is implemented as one or more cognitive graphs. In certain embodiments, the cognitive graph may be implemented as an application cognitive graph, a cognitive session graph, a cognitive persona, or a cognitive profile, all of which are described in greater detail herein. The method by which the data is provided to the shared analytics services 930 by the individual data subscription services 922 is a matter of design choice.

In various embodiments, the fault-tolerant data compute architecture 926 is implemented to provide an operational framework capable of reliably supporting the other elements of the universal knowledge repository 918. In these embodiments, fault-tolerant approaches familiar to those of skill in the art are implemented to accommodate needs to perform various cognitive learning operations described in greater detail herein. The method by which these approaches are implemented is a matter of design choice.

In various embodiments, the data sovereignty, security, lineage and traceability system 928 is implemented to ensure that data ownership rights are observed, data privacy is safeguarded, and data integrity is not compromised. In certain embodiments, data sovereignty, security, lineage and traceability system 928 is likewise implemented to provide a record of not only the source of the data throughout its lifecycle, but also how it has been used, by whom, and for what purpose. Those of skill in the art will recognize many such embodiments are possible and the foregoing is not intended to limit the spirit, scope or intent of the invention.

In this embodiment, the shared analytics services 930 includes Natural Language Processing (NLP) 932 services, development services 934, models-as-a-service 936, management services 938, profile services 940, and ecosystem services 942. In various embodiments, the NLP 932 services include services related to the provision and management of NLP approaches and processes known to skilled practitioners of the art. In these embodiments, NLP 932 services are implemented by a CILS during the performance of cognitive learning operations, as described in greater detail herein. The method by which individual NLP 932 services are implemented by the CILS is a matter of design choice.

In various embodiments, the development services 934 include services related to the management of data and models as they relate to the development of various analytic approaches known skilled practitioners of the art. In certain embodiments, the models-as-a-service 936 includes services for the management and provision of a model. In various embodiments, the models as a service 936 may be implemented to create and provide a model composed of other models. In this embodiment, the method by which the models-as-a-service 936 is implemented to create and provide such a composite model is a matter of design choice. In certain embodiments, the management services 938 include services related to the management and provision of individual services associated with, or a part of, the shared analytics services 930.

In various embodiments, the profile services 940 include services related to the provision and management of cognitive personas and cognitive profiles used by a CILS when performing a cognitive learning operation. As used herein, a cognitive persona broadly refers to an archetype user model that represents a common set of attributes associated with a hypothesized group of users. In various embodiments, the common set of attributes may be described through the use of demographic, geographic, psychographic, behavioristic, and other information. As an example, the demographic information may include age brackets (e.g., 25 to 34 years old), gender, marital status (e.g., single, married, divorced, etc.), family size, income brackets, occupational classifications, educational achievement, and so forth. Likewise, the geographic information may include the cognitive persona's typical living and working locations (e.g., rural, semi-rural, suburban, urban, etc.) as well as characteristics associated with individual locations (e.g., parochial, cosmopolitan, population density, etc.).

The psychographic information may likewise include information related to social class (e.g., upper, middle, lower, etc.), lifestyle (e.g., active, healthy, sedentary, reclusive, etc.), interests (e.g., music, art, sports, etc.), and activities (e.g., hobbies, travel, going to movies or the theatre, etc.). Other psychographic information may be related to opinions, attitudes (e.g., conservative, liberal, etc.), preferences, motivations (e.g., living sustainably, exploring new locations, etc.), and personality characteristics (e.g., extroverted, introverted, etc.) Likewise, the behavioristic information may include information related to knowledge and attitude towards various manufacturers or organizations and the products or services they may provide.

In various embodiments, the behavioristic information is used by a behavior learning technique, described in greater detail herein, in the performance of a cognitive learning operation. To continue the example, the behavioristic information may be related to brand loyalty, interest in purchasing a product or using a service, usage rates, perceived benefits, and so forth. Skilled practitioners of the art will recognize that many such attributes are possible and the foregoing is not intended to limit the spirit, scope or intent of the invention.

In various embodiments, one or more cognitive personas may be associated with a user. In certain embodiments, a cognitive persona is selected and then used by a CILS to generate one or more composite cognitive insights as described in greater detail herein. In these embodiments, the composite cognitive insights that are generated for a user as a result of using a first cognitive persona may be different than the composite cognitive insights that are generated as a result of using a second cognitive persona.

In various embodiments, provision of the composite cognitive insights results in the CILS receiving feedback 958 data from various individual users and other sources, such as cognitive business processes and applications 948. In one embodiment, the feedback 958 data is used to revise or modify the cognitive persona. In another embodiment, the feedback 958 data is used to create a new cognitive persona. In yet another embodiment, the feedback 958 data is used to create one or more associated cognitive personas, which inherit a common set of attributes from a source cognitive persona. In one embodiment, the feedback 958 data is used to create a new cognitive persona that combines attributes from two or more source cognitive personas. In another embodiment, the feedback 958 data is used to create a cognitive profile, described in greater detail herein, based upon the cognitive persona. Those of skill in the art will realize that many such embodiments are possible and the foregoing is not intended to limit the spirit, scope or intent of the invention.

As used herein, a cognitive profile refers to an instance of a cognitive persona that references personal data associated with a user. In various embodiments, the personal data may include the user's name, address, Social Security Number (SSN), age, gender, marital status, occupation, employer, income, education, skills, knowledge, interests, preferences, likes and dislikes, goals and plans, and so forth. In certain embodiments, the personal data may include data associated with the user's interaction with a CILS and related composite cognitive insights that are generated and provided to the user. In various embodiments, the user's interaction with a CILS may be provided to the CILS as feedback 958 data.

In various embodiments, the personal data may be distributed. In certain of these embodiments, subsets of the distributed personal data may be logically aggregated to generate one or more cognitive profiles, each of which is associated with the user. Skilled practitioners of the art will recognize that many such embodiments are possible and the foregoing is not intended to limit the spirit, scope or intent of the invention.

In various embodiments, a cognitive persona or cognitive profile is defined by a first set of nodes in a weighted cognitive graph. In these embodiments, the cognitive persona or cognitive profile is further defined by a set of attributes that are respectively associated with a set of corresponding nodes in the weighted cognitive graph. In various embodiments, an attribute weight is used to represent a relevance value between two attributes. For example, a higher numeric value (e.g., '5.0') associated with an attribute weight may indicate a higher degree of relevance between two attributes, while a lower numeric value (e.g., '0.5') may indicate a lower degree of relevance.

In various embodiments, the numeric value associated with attribute weights may change as a result of the performance of composite cognitive insight and feedback 958 operations described in greater detail herein. In one embodiment, the changed numeric values associated with the attribute weights may be used to modify an existing cognitive persona or cognitive profile. In another embodiment, the changed numeric values associated with the attribute weights may be used to generate a new cognitive persona or cognitive profile. In certain embodiments, various ecosystem services 942 are implemented to manage various aspects of the CILS infrastructure, such as interaction with external services. The method by which these various aspects are managed is a matter of design choice.

In various embodiments, the deep cognition engine 944 is implemented to provide deep contextual understanding and interpretation as various cognitive learning operations, described in greater detail herein, are being performed by a CILS. In certain embodiments, the deep cognition engine 944 may include a perceive 506 phase, a relate 508 phase, an operate 510 phase, a process and execute 512 phase, and a learn 514 phase. In various embodiments, streams of data are sourced from the repositories of multi-structured data 904 are delivered 956 by sourcing agents, described in greater detail herein to the deep cognition engine 944. In these embodiments, the source streams of data are dynamically ingested in real-time during the perceive 506 phase, and based upon a context, extraction, parsing, and tagging operations are performed on language, text and images contained therein.

Automatic feature extraction and modeling operations are then performed with the previously processed source streams of data during the relate 508 phase to generate queries to identify related data. In various embodiments, cognitive learning operations are performed during the operate 510 phase to discover, summarize and prioritize various concepts, described in greater detail herein, which are in turn used to generate actionable recommendations and notifications associated. The resulting actionable recommendations and notifications are then processed during the process and execute 512 phase to deliver 956 composite cognitive insights, such as recommendations, to the cognitive insights as a service 946 module.

In various embodiments, features from newly-observed data are automatically extracted from user interaction 950 during the learn 514 phase to improve various analytical models. In these embodiments, the learn 514 phase includes feedback 958 data associated with observations generated during the relate 508 phase, which is provided to the perceive 506 phase. Likewise, feedback 958 data on decisions resulting from operations performed during the operate 510 phase, and feedback 958 data related to results resulting from operations performed during the process and execute 512 phase, are also provided to the perceive 506 phase.

In various embodiments, user interactions 950 result from operations performed during the process and execute 512 phase. In these embodiments, data associated with the user interactions 950 is provided as feedback 958 data to the perceive 506 phase. As an example, a first query from a user may be submitted to the CILS system, which in turn generates a first cognitive insight, which is then provided to the user. In response, the user may respond by providing a first response, or perhaps a second query, either of which is provided in the same context as the first query. The CILS receives the first response or second query, performs various cognitive learning operations, and provides the user a second cognitive insight. As before, the user may respond with a second response or a third query, in the context of the first or second query. Once again, the CILS performs various cognitive learning operations and provides the user a third cognitive insight, and so forth.

In various embodiments, data may be delivered 956 from the repositories of multi-structured data 904 to the universal knowledge repository 918, which in turn may deliver 956 data to individual shared analytics services 930. In turn, individual shared analytics services 930 may deliver 956 resulting data to the deep cognition engine 944. Likewise, the deep cognition engine 944 may in turn deliver 956 data to the cognitive insights as a service 946. In turn, the cognitive insights as a service 946 module may deliver data to various cognitive business processes and applications 948.

In certain embodiments, the data delivered 956 by the cognitive insights as a service 946 to the various cognitive business processes and applications 948 includes composite cognitive insights, described in greater detail herein. In various embodiments, the various cognitive business processes and applications 948 may provide data, including composite cognitive insights, for interaction 950, described in greater detail herein. In certain embodiments, the interaction may include user interaction resulting in the provision of user input data, likewise described in greater detail herein.

In various embodiments, the interaction results in the provision of feedback 958 data to the various cognitive business processes and applications 948, where it may be provided as feedback 958 data to the cognitive insights as a service 946 module. Likewise, the cognitive insights as a service 946 module may provide resulting feedback 958 data to the deep cognition engine 944 for processing. In turn, the deep cognition engine 944 may provide resulting feedback 958 data to individual shared analytics services 930, which likewise may provide resulting feedback 958 data to the universal knowledge repository 918.

In certain embodiments, the feedback 958 data provided to the universal knowledge repository 918 is used, as described in greater detail herein, to update the cognitive knowledge model 924. In various embodiments, the universal knowledge repository 918 may likewise provide feedback 958 data to various repositories of multi-structured data 904. In certain embodiments, the feedback 958 data is used to update repositories of multi-structured data 904. In these embodiments, the feedback 958 data may include updated data, new data, metadata, or a combination thereof.

In various embodiments, a first CILS element may iteratively deliver 956 data to, and receive resulting feedback 958 data from, a second CILS element prior to the second CILS element delivers data to a third CILS element. As an example, the universal knowledge repository 918 may deliver 956 a first set of data to the NLP services 932, which results in a first set of feedback 958 data being returned to the universal knowledge repository 918. As a result of receiving the first set of feedback 958 data, the universal knowledge repository 918 may provide a second set of data to the models-as-a-service 936, which results in the generation of a second set of data. In this example, the second set of data is then delivered 956 to the deep cognition engine 944.

In one embodiment, the feedback 958 data received as a result of an interaction 950 is provided to each of the individual CILS elements. In another embodiment, feedback 958 data received from one CILS element is modified before it is provided as modified feedback 958 data to another CILS element. In yet another embodiment, feedback 958 data received from one CILS element is not modified before it is provided as unmodified feedback 958 data to another CILS element. Skilled practitioners will recognize that many such embodiments are possible and the foregoing is not intended to limit the spirit, scope or intent of the invention.

In various embodiments, the CILS is implemented to manage the lifecycle 960 of a cognitive learning operation. In this embodiment, the cognitive learning operation lifecycle 960 includes a source 962, a learn 965, an infer 966, an interpret 968 and an act 970 lifecycle phase. As shown in FIG. 9, the source 962, a learn 965, an infer 966, an interpret 968 and act 970 lifecycle phases can interact with one another by providing and receiving data between adjacent phases. In addition, the act 970 phase can provide data to the source 962 phase. In certain embodiments, the data the act 907 phase provides to the source 962 phase included feedback data resulting from an interaction, described in greater detail herein.

In various embodiments, the source 962 lifecycle phase is implemented to acquire data from the repositories of multi-structured data 904, which in turn is provided to the universal knowledge repository 918. In one embodiment, the data is provided to the cognitive knowledge model 924 via the implementation of the fault-tolerant data compute architecture 926. In another embodiment, the data sovereignty, security, lineage and traceability system 928 is implemented to ensure that data ownership rights are observed, data privacy is safeguarded, and data integrity is not compromised during the source 962 lifecycle phase. In certain embodiments, data sovereignty, security, lineage and traceability system 928 is likewise implemented to provide a record of not only the source of the data throughout its lifecycle, but also how it has been used, by whom, and for what purpose.

In various embodiments, the learn 964 lifecycle phase is implemented to manage cognitive learning operations being performed by a CILS, as described in greater detail herein. In certain embodiments, cognitive agents 920 are used in the performance of these cognitive learning operations. In one embodiment, a learning agent is used in the performance of certain cognitive learning operations, as described in greater detail herein.

In various embodiments, the infer 966 lifecycle phase is implemented to perform cognitive learning operations, described in greater detail herein. In certain embodiments, an inferred learning style, described in greater detail herein, is implemented by the CILS to perform these cognitive learning operations. In one embodiment, a concept entailment cognitive learning technique is implemented by the CILS to perform a cognitive learning operation in the infer 966 lifecycle phase. In another embodiment, a contextual recommendation cognitive learning technique is implemented by the CILS to perform a cognitive learning operation in the infer 966 lifecycle phase.

In these embodiments, the CILS may implement a probabilistic reasoning machine learning algorithm, described in greater detail herein, in combination with the concept entailment or contextual recommendation cognitive learning technique. In certain embodiments, the CILS may implement a reinforcement learning approach, likewise described in greater detail herein, in combination with the concept entailment or contextual recommendation cognitive learning technique. Skilled practitioners of the art will recognize that many such embodiments are possible and the foregoing is not intended to limit the spirit, scope or intent of the invention.

In various embodiments, the interpret 968 lifecycle phase is implemented to interpret the results of a cognitive learning operation such that they are consumable by a recipient, and by extension, present it in a form that is actionable in the act 970 lifecycle phase. In various embodiments, the act 970 lifecycle phase is implemented to support an interaction 950, described in greater detail herein. In certain embodiments, the interaction 950 includes interactions with a user, likewise described in greater detail herein. Skilled practitioners of the art will recognize that many such embodiments are possible and the foregoing is not intended to limit the spirit, scope or intent of the invention.

Figure 10A:
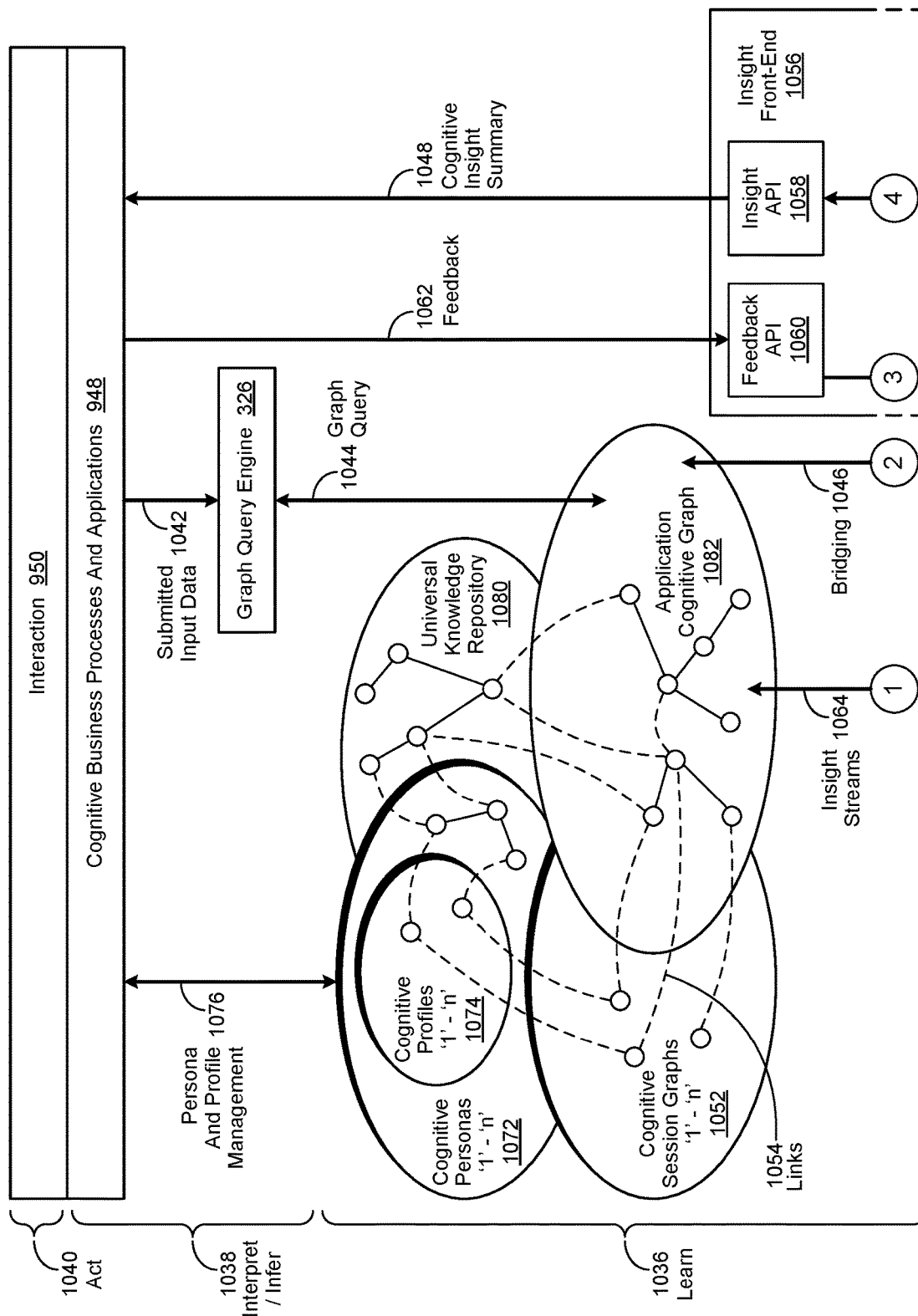
FIGS. 10a and 10b are a simplified process flow diagram of the performance of cognitive learning operations by a CILS.
Figure 10B:
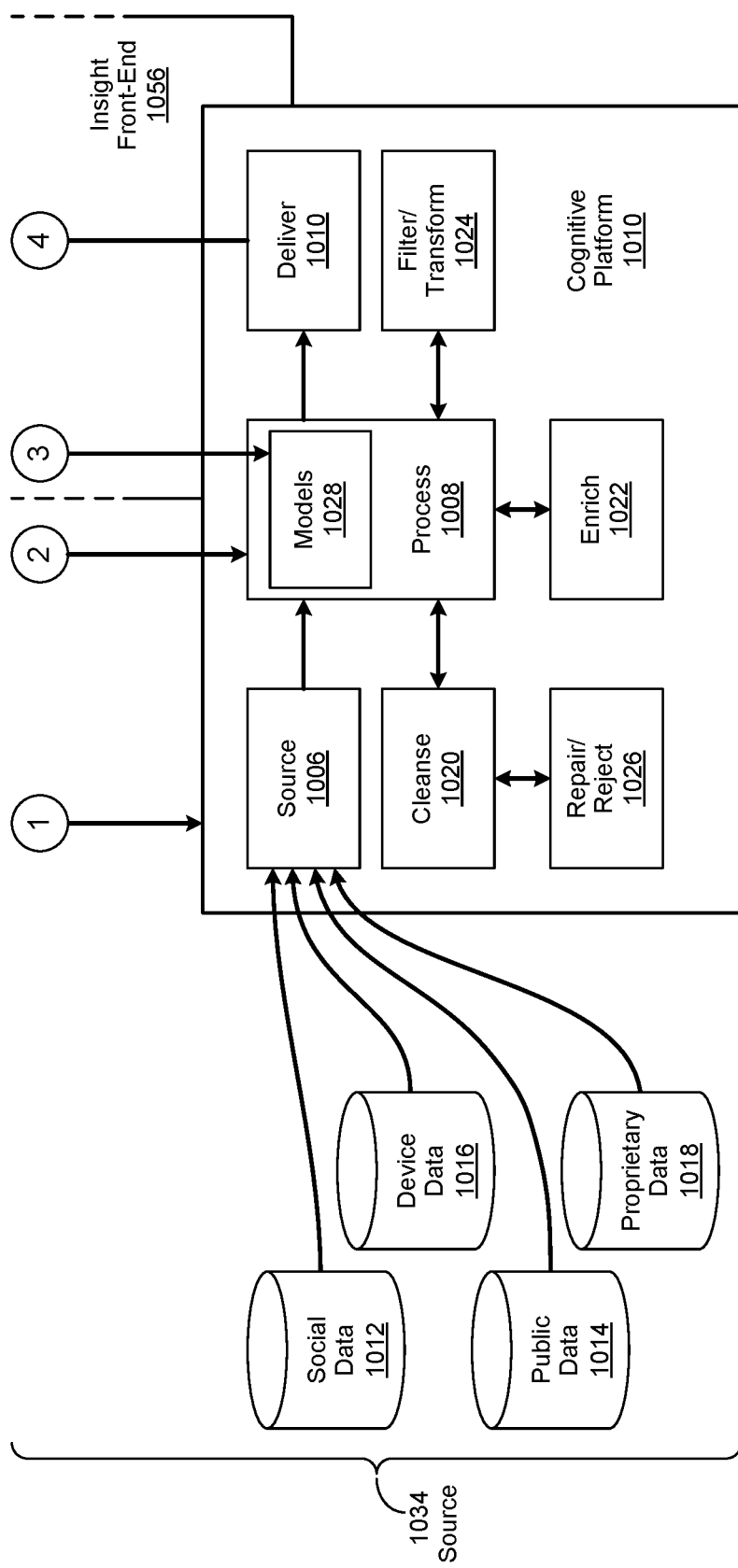

FIGS. 10a and 10b are a simplified process flow diagram of the performance of cognitive learning operations by a Cognitive Inference and Learning System (CILS) implemented in accordance with an embodiment of the invention. As used herein, a cognitive learning operation broadly refers to the implementation of a cognitive learning technique, described in greater detail herein, to generate a cognitive learning result. In various embodiments, the cognitive learning technique is implemented in combination with the provision of a composite cognitive insight. As likewise used herein, a composite cognitive insight broadly refers to a set of cognitive insights generated as a result of orchestrating a set of independent cognitive agents, referred to herein as insight agents.

In various embodiments, the insight agents use a cognitive graph, such as an application cognitive graph 1082, as their data source to respectively generate individual cognitive insights. As used herein, an application cognitive graph 1082 broadly refers to a cognitive graph that is associated with a business process or cognitive application 304. In certain embodiments, different cognitive business processes and applications 304 may interact with different application cognitive graphs 1082 to generate individual cognitive insights for a user. In various embodiments, the resulting individual cognitive insights are then composed to generate a set of composite cognitive insights, which in turn is provided to a user in the form of a cognitive insight summary 1048.

In various embodiments, the orchestration of the selected insight agents is performed by the cognitive insight/learning engine 330 shown in FIGS. 3 and 4a. In certain embodiments, a subset of insight agents is selected to provide composite cognitive insights to satisfy a graph query 1044, a contextual situation, or some combination thereof. In various embodiments, input data related to the contextual situation is used by the CILS to perform a cognitive learning operation, as described in greater detail herein. For example, it may be determined, as likewise described in greater detail herein, that a particular subset of insight agents may be suited to provide a composite cognitive insight related to a particular user of a particular device, at a particular location, at a particular time, for a particular purpose.

In certain embodiments, the insight agents are selected for orchestration as a result of receiving direct or indirect input from a user. In various embodiments, the direct user input may be a natural language inquiry. In certain embodiments, the indirect user input may include the location of a user's device or the purpose for which it is being used. As an example, the Geographical Positioning System (GPS) coordinates of the location of a user's mobile device may be received as indirect user input. As another example, a user may be using the integrated camera of their mobile device to take a photograph of a location, such as a restaurant, or an item, such as a food product. In certain embodiments, the direct or indirect user input may include personal information that can be used to identify the user. Skilled practitioners of the art will recognize that many such embodiments are possible and the foregoing is not intended to limit the spirit, scope or intent of the invention.

In various embodiments, cognitive learning operations may be performed in various phases of a cognitive learning process. In this embodiment, these phases include a source 1034 phase, a learn 1036 phase, an interpret/infer 1038 phase, and an act 1040 phase. In the source 1034 phase, a instantiation of a cognitive platform 1010 sources social data 1012, public data 1014, device data 1016, and proprietary data 1018 from various sources as described in greater detail herein. In various embodiments, an example of a cognitive platform 1010 instantiation is the cognitive platform 310 shown in FIGS. 3, 4*a*, and 4*b*. In this embodiment, the instantiation of a cognitive platform 1010 includes a source 1006 component, a process 1008 component, a deliver 1010 component, a cleanse 1020 component, an enrich 1022 component, a filter/transform 1024 component, and a repair/reject 1026 component. Likewise, as shown in FIG. 10*a*, the process 1008 component includes a repository of models 1028, described in greater detail herein.

In various embodiments, the process 1008 component is implemented to perform various composite insight generation and other processing operations described in greater detail herein. In these embodiments, the process 1008 component is implemented to interact with the source 1006 component, which in turn is implemented to perform various data sourcing operations described in greater detail herein. In various embodiments, the sourcing operations are performed by one or more sourcing agents, as likewise described in greater detail herein. The resulting sourced data is then provided to the process 1008 component. In turn, the process 1008 component is implemented to interact with the cleanse 1020 component, which is implemented to perform various data cleansing operations familiar to those of skill in the art. As an example, the cleanse 1020 component may perform data normalization or pruning operations, likewise known to skilled practitioners of the art. In certain embodiments, the cleanse 1020 component may be implemented to interact with the repair/reject 1026 component, which in turn is implemented to perform various data repair or data rejection operations known to those of skill in the art.

Once data cleansing, repair and rejection operations are completed, the process 1008 component is implemented to interact with the enrich 1022 component, which is implemented in various embodiments to perform various data enrichment operations described in greater detail herein. Once data enrichment operations have been completed, the process 1008 component is likewise implemented to interact with the filter/transform 1024 component, which in turn is implemented to perform data filtering and transformation operations described in greater detail herein.

In various embodiments, the process 1008 component is implemented to generate various models, described in greater detail herein, which are stored in the repository of models 1028. The process 1008 component is likewise implemented in various embodiments to use the sourced data to generate one or more cognitive graphs, such as an application cognitive graph 1082, as likewise described in greater detail herein. In various embodiments, the process 1008 component is implemented to gain an understanding of the data sourced from the sources of social data 1012, public data 1014, device data 1016, and proprietary data 1018, which assist in the automated generation of the application cognitive graph 1082.

The process 1008 component is likewise implemented in various embodiments to perform bridging 1046 operations, described in greater detail herein, to access the application cognitive graph 1082. In certain embodiments, the bridging 1046 operations are performed by bridging agents, likewise described in greater detail herein. In various embodiments, the application cognitive graph 1082 is accessed by the process 1008 component during the learn 1036 phase of the composite cognitive insight generation operations.

In various embodiments, a cognitive business process or application 304 is implemented to receive input data associated with an individual user or a group of users. In these embodiments, the input data may be direct, such as a user query or mouse click, or indirect, such as the current time or Geographical Positioning System (GPS) data received from a mobile device associated with a user. In various embodiments, the indirect input data may include contextual data, described in greater detail herein. Once it is received, the input data is then submitted 1042 by the cognitive business process or application 304 to a graph query engine 326 during the interpret/infer 1038 phase. In various embodiments, an inferred learning style, described in greater detail herein, is implemented by the CILS to perform cognitive learning operations. In certain embodiments, the CILS is likewise implemented to interpret the results of the cognitive learning operations such that they are consumable by a recipient, and by extension, present it in a form that is actionable in the act 1040 phase. In various embodiments, the act 1040 phase is implemented to support an interaction 950, described in greater detail herein.

The submitted 1042 input data is then processed by the graph query engine 326 to generate a graph query 1044, as described in greater detail herein. The graph query 1044 is then used to query the application cognitive graph 1082, which results in the generation of one or more composite cognitive insights, likewise described in greater detail herein. In certain embodiments, the graph query 1044 uses knowledge elements stored in the universal knowledge repository 1080 when querying the application cognitive graph 1082 to generate the one or more composite cognitive insights.

In various embodiments, the graph query 1044 results in the selection of a cognitive persona, described in greater detail herein, from a repository of cognitive personas '1' through 'n' 1072, according to a set of contextual information associated with a user. In certain embodiments, the universal knowledge repository 1080 includes the repository of personas '1' through 'n' 1072. In various embodiments, individual nodes within cognitive personas stored in the repository of personas '1' through 'n' 1072 are linked 1054 to corresponding nodes in the universal knowledge repository 1080. In certain embodiments, nodes within the universal knowledge repository 1080 are likewise linked to nodes within the cognitive application graph 1082.

As used herein, contextual information broadly refers to information associated with a location, a point in time, a user role, an activity, a circumstance, an interest, a desire, a perception, an objective, or a combination thereof. In various embodiments, the contextual information is used in combination with the selected cognitive persona to generate one or more composite cognitive insights for a user. In certain embodiments, the contextual information may likewise be used in combination with the selected cognitive persona to perform one or more associated cognitive learning operations. In one embodiment, the composite cognitive insights that are generated for a user as a result of using a first set of contextual information in combination with the selected cognitive persona may be different than the composite cognitive insights that are generated as a result of using a second set of contextual information in combination with the same cognitive persona.

In another embodiment, the result of using a first set of contextual information in combination with the selected cognitive persona to perform an associated cognitive learning operation may be different than the result of using a second set of contextual information in combination with the selected cognitive persona to perform the same cognitive learning operation. In yet another embodiment, the composite cognitive insights that are generated for a user as a result of using a set of contextual information with a first cognitive persona may be different than the composite cognitive insights that are generated as a result of using the same set of contextual information with a second cognitive persona. In yet still another embodiment, the result of using a set of contextual information in combination with a first cognitive persona to perform an associated cognitive learning operation may be different than the result of using the same set of contextual information in combination with a second cognitive persona to perform the same cognitive learning operation.

As an example, a user may have two associated cognitive personas, "purchasing agent" and "retail shopper," which are respectively selected according to two sets of contextual information. In this example, the "purchasing agent" cognitive persona may be selected according to a first set of contextual information associated with the user performing business purchasing activities in their office during business hours, with the objective of finding the best price for a particular commercial inventory item. Conversely, the "retail shopper" cognitive persona may be selected according to a second set of contextual information associated with the user performing cognitive personal shopping activities in their home over a weekend, with the objective of finding a decorative item that most closely matches their current furnishings.

Those of skill in the art will realize that the composite cognitive insights generated as a result of combining the first cognitive persona with the first set of contextual information will likely be different than the composite cognitive insights generated as a result of combining the second cognitive persona with the second set of contextual information. Likewise, the result of a cognitive learning operation that uses the first cognitive persona in combination with the first set of contextual information will likely be different that the result of a cognitive learning operation that uses a second cognitive persona in combination with a second set of contextual information.

In various embodiments, the graph query 1044 results in the selection of a cognitive profile, described in greater detail herein, from a repository of cognitive profiles '1' through 'n' 1074 according to identification information associated with a user. The method by which the identification information is determined is a matter of design choice. In certain embodiments, a set of contextual information associated with a user is used to select a cognitive profile from the repository of cognitive profiles '1' through 'n' 1074. In various embodiments, one or more cognitive profiles may be associated with a user.

In these embodiments, a cognitive profile is selected and then used by a CILS to generate one or more composite cognitive insights for the user as described in greater detail herein. In certain of these embodiments, the selected cognitive profile provides a basis for adaptive changes to the CILS, and by extension, the composite cognitive insights it generates. In various embodiments, a cognitive profile may likewise by selected and then used by a CILS to perform one or more cognitive learning operations as described in greater detail herein. In certain of these embodiments, the results of the one or more cognitive learning operations may likewise provide a basis for adaptive changes to the CILS, and by extension, the use of cognitive learning techniques in the performance of subsequent cognitive learning operations.

In various embodiments, provision of the composite cognitive insights results in the CILS receiving feedback 1062 information related to an individual user. In one embodiment, the feedback 1062 information is used to revise or modify a cognitive persona. In another embodiment, the feedback 1062 information is used to revise or modify the cognitive profile associated with a user. In yet another embodiment, the feedback 1062 information is used to create a new cognitive profile, which in turn is stored in the repository of cognitive profiles '1' through 'n' 1074. In still yet another embodiment, the feedback 1062 information is used to create one or more associated cognitive profiles, which inherit a common set of attributes from a source cognitive profile. In another embodiment, the feedback 1062 information is used to create a new cognitive profile that combines attributes from two or more source cognitive profiles. In various embodiments, these persona and profile management operations 1076 are performed through interactions between the cognitive business processes and applications 304, the repository of cognitive personas '1' through 'n' 1072, the repository of cognitive profiles '1' through 'n' 1074, the universal knowledge repository 1080, or some combination thereof.

In various embodiments, the feedback 1062 is generated as a result of an interaction 950. In various embodiments, the interaction 950 may be between any combination of devices, applications, services, processes, or users. In certain embodiments, the interaction 950 may be explicitly or implicitly initiated by the provision of input data to the devices, applications, services, processes or users. In various embodiments, the input data may be provided in response to a composite cognitive insight provided by a CILS. In one embodiment, the input data may include a user gesture, such as a key stroke, mouse click, finger swipe, or eye movement. In another embodiment, the input data may include a voice command from a user.

In yet another embodiment, the input data may include data associated with a user, such as biometric data (e.g., retina scan, fingerprint, body temperature, pulse rate, etc.). In yet still another embodiment, the input data may include environmental data (e.g., current temperature, etc.), location data (e.g., geographical positioning system coordinates, etc.), device data (e.g., telemetry data, etc.), or other data provided by a device, application, service, process or user. In these embodiments, the feedback 1062 may be used to perform various cognitive learning operations, the results of which are used to update a cognitive persona or profile associated with a user. Those of skill in the art will realize that many such embodiments are possible and the foregoing is not intended to limit the spirit, scope or intent of the invention.

In various embodiments, a cognitive profile associated with a user may be either static or dynamic. As used herein, a static cognitive profile refers to a cognitive profile that contains identification information associated with a user that changes on an infrequent basis. As an example, a user's name, Social Security Number (SSN), or passport number may not change, although their age, address or employer may change over time. To continue the example, the user may likewise have a variety of financial account identifiers and various travel awards program identifiers which change infrequently.

As likewise used herein, a dynamic cognitive profile refers to a cognitive profile that contains information associated with a user that changes on a dynamic basis. For example, a user's interests and activities may evolve over time, which may be evidenced by associated interactions 950 with the CILS. In various embodiments, these interactions 950 result in the provision of associated composite cognitive insights to the user. In certain embodiments, these interactions 950 may likewise be used to perform one or more associated cognitive learning operations, the results of which may in turn be used to generate an associated composite cognitive insight. In these embodiments, the user's interactions 950 with the CILS, and the resulting composite cognitive insights that are generated, are used to update the dynamic cognitive profile on an ongoing basis to provide an up-to-date representation of the user in the context of the cognitive profile used to generate the composite cognitive insights.

In various embodiments, a cognitive profile, whether static or dynamic, is selected according to a set of contextual information associated with a user. In certain embodiments, the contextual information is likewise used in combination with the selected cognitive profile to generate one or more composite cognitive insights for the user. In various embodiments, the contextual information may likewise be used in combination with the selected cognitive profile perform one or more associated cognitive learning operations. In one embodiment, the composite cognitive insights that are generated as a result of using a first set of contextual information in combination with the selected cognitive profile may be different than the composite cognitive insights that are generated as a result of using a second set of contextual information with the same cognitive profile.

In another embodiment, the result of using a first set of contextual information in combination with the selected cognitive profile to perform an associated cognitive learning operation may be different than the result of using a second set of contextual information in combination with the selected cognitive profile to perform the same cognitive learning operation. In yet another embodiment, the composite cognitive insights that are generated for a user as a result of using a set of contextual information with a first cognitive profile may be different than the composite cognitive insights that are generated as a result of using the same set of contextual information with a second cognitive profile. In yet still another embodiment, the result of using a set of contextual information in combination with a first cognitive profile to perform an associated cognitive learning operation may be different than the result of using the same set of contextual information in combination with a second cognitive profile to perform the same cognitive learning operation.

As an example, a user may have two associated cognitive profiles, "runner" and "foodie," which are respectively selected according to two sets of contextual information. In this example, the "runner" cognitive profile may be selected according to a first set of contextual information associated with the user being out of town on business travel and wanting to find a convenient place to run close to where they are staying. To continue this example, two composite cognitive insights may be generated and provided to the user in the form of a cognitive insight summary 1248. The first may be suggesting a running trail the user has used before and liked, but needs directions to find again. The second may be suggesting a new running trail that is equally convenient, but wasn't available the last time the user was in town.

Conversely, the "foodie" cognitive profile may be selected according to a second set of contextual information associated with the user being at home and expressing an interest in trying either a new restaurant or an innovative cuisine. To further continue this example, the user's "foodie" cognitive profile may be processed by the CILS to determine which restaurants and cuisines the user has tried in the last eighteen months. As a result, two composite cognitive insights may be generated and provided to the user in the form of a cognitive insight summary 1048. The first may be a suggestion for a new restaurant that is serving a cuisine the user has enjoyed in the past. The second may be a suggestion for a restaurant familiar to the user that is promoting a seasonal menu featuring Asian fusion dishes, which the user has not tried before.

Those of skill in the art will realize that the composite cognitive insights generated as a result of combining the first cognitive profile with the first set of contextual information will likely be different than the composite cognitive insights generated as a result of combining the second cognitive profile with the second set of contextual information. Likewise, the result of a cognitive learning operation that uses the first cognitive profile in combination with the first set of contextual information will likely be different that the result of a cognitive learning operation that uses a second cognitive profile in combination with a second set of contextual information.

In various embodiments, a user's cognitive profile, whether static or dynamic, may reference data that is proprietary to the user, an organization, or a combination thereof. As used herein, proprietary data broadly refers to data that is owned, controlled, or a combination thereof, by an individual user or an organization, which is deemed important enough that it gives competitive advantage to that individual or organization. In certain embodiments, the organization may be a governmental, non-profit, academic or social entity, a manufacturer, a wholesaler, a retailer, a service provider, an operator of a cognitive inference and learning system (CILS), and others.

In various embodiments, an organization may or may not grant a user the right to obtain a copy of certain proprietary information referenced by their cognitive profile. In certain embodiments, a first organization may or may not grant a user the right to obtain a copy of certain proprietary information referenced by their cognitive profile and provide it to a second organization. As an example, the user may not be granted the right to provide travel detail information (e.g., travel dates and destinations, etc.) associated with an awards program provided by a first travel services provider (e.g., an airline, a hotel chain, a cruise ship line, etc.) to a second travel services provider. In various embodiments, the user may or may not grant a first organization the right to provide a copy of certain proprietary information referenced by their cognitive profile to a second organization. Those of skill in the art will recognize that many such embodiments are possible and the foregoing is not intended to limit the spirit, scope or intent of the invention.

In various embodiments, a set of contextually-related interactions between a cognitive business process or application 304 and the application cognitive graph 1082 are represented as a corresponding set of nodes in a cognitive session graph, which is then stored in a repository of session graphs '1' through 'n' 1052. As used herein, a cognitive session graph broadly refers to a cognitive graph whose nodes are associated with a cognitive session. As used herein, a cognitive session broadly refers to a user, group of users, theme, topic, issue, question, intent, goal, objective, task, assignment, process, situation, requirement, condition, responsibility, location, period of time, or any combination thereof. In various embodiments, the results of a cognitive learning operation, described in greater detail herein, may be stored in a session graph.

As an example, the application cognitive graph 1082 may be unaware of a particular user's preferences, which are likely stored in a corresponding user profile. To further the example, a user may typically choose a particular brand or manufacturer when shopping for a given type of product, such as cookware. A record of each query regarding that brand of cookware, or its selection, is iteratively stored in a session graph that is associated with the user and stored in a repository of session graphs '1' through 'n' 1052. As a result, the preference of that brand of cookware is ranked higher, and is presented in response to contextually-related queries, even when the preferred brand of cookware is not explicitly referenced by the user. To continue the example, the user may make a number of queries over a period of days or weeks, yet the queries are all associated with the same cognitive session graph that is associated with the user and stored in a repository of session graphs '1' through 'n' 1052, regardless of when each query is made. In this example, the record of each query is used to perform an associated cognitive learning operation, the results of which may be stored in an associated session graph.

As another example, a user queries a cognitive application 304 during business hours to locate an upscale restaurant located close their place of business. As a result, a first cognitive session graph stored in a repository of session graphs '1' through 'n' 1052 is associated with the user's query, which results in the provision of composite cognitive insights related to restaurants suitable for business meetings. To continue the example, the same user queries the same cognitive application 304 during the weekend to locate a casual restaurant located close to their home. As a result, a second cognitive session graph stored in a repository of session graphs '1' through 'n' 1052 is associated with the user's query, which results in the provision of composite cognitive insights related to restaurants suitable for family meals. In these examples, the first and second cognitive session graphs are both associated with the same user, but for two different purposes, which results in the provision of two different sets of composite cognitive insights.

As yet another example, a group of customer support representatives is tasked with resolving technical issues customers may have with a product. In this example, the product and the group of customer support representatives are collectively associated with a cognitive session graph stored in a repository of session graphs '1' through 'n' 1052. To continue the example, individual customer support representatives may submit queries related to the product to a cognitive application 304, such as a knowledge base application. In response, a cognitive session graph stored in a repository of session graphs '1' through 'n' 1052 is used, along with the universal knowledge repository 1080 and application cognitive graph 1082, to generate individual or composite cognitive insights to resolve a technical issue for a customer. In this example, the cognitive application 304 may be queried by the individual customer support representatives at different times during some time interval, yet the same cognitive session graph stored in a repository of session graphs '1' through 'n' 1052 is used to generate composite cognitive insights related to the product.

In various embodiments, each cognitive session graph associated with a user and stored in a repository of session graphs '1' through 'n' 1052 includes one or more direct or indirect user queries represented as nodes, and the time at which they were asked, which are in turn linked 1054 to nodes that appear in the application cognitive graph 1082. In certain embodiments, each individual session graph that is associated with the user and stored in a repository of session graphs '1' through 'n' 1052 introduces edges that are not already present in the application cognitive graph 1082. More specifically, each of the session graphs that is associated with the user and stored in a repository of session graphs '1' through 'n' 1052 establishes various relationships that the application cognitive graph 1082 does not already have.

In various embodiments, individual cognitive profiles in the repository of profiles '1' through 'n' 1074 are respectively stored as session graphs in the repository of session graphs 1052. In these embodiments, nodes within each of the individual cognitive profiles are linked 1054 to nodes within corresponding cognitive session graphs stored in the repository of cognitive session graphs '1' through 'n' 1054. In certain embodiments, individual nodes within each of the cognitive profiles are likewise linked 1054 to corresponding nodes within various cognitive personas stored in the repository of cognitive personas '1' through 'n' 1072.

In various embodiments, individual graph queries 1044 associated with a session graph stored in a repository of session graphs '1' through 'n' 1052 are likewise provided to insight agents to perform various kinds of analyses. In certain embodiments, each insight agent performs a different kind of analysis. In various embodiments, different insight agents may perform the same, or similar, analyses. In certain embodiments, different agents performing the same or similar analyses may be competing between themselves.

For example, a user may be a realtor that has a young, upper middle-class, urban-oriented clientele that typically enjoys eating at trendy restaurants that are in walking distance of where they live. As a result, the realtor may be interested in knowing about new or popular restaurants that are in walking distance of their property listings that have a young, middle-class clientele. In this example, the user's queries may result the assignment of insight agents to perform analysis of various social media interactions to identify such restaurants that have received favorable reviews. To continue the example, the resulting composite insights may be provided as a ranked list of candidate restaurants that may be suitable venues for the realtor to meet his clients.

In various embodiments, the process 1008 component is implemented to provide these composite cognitive insights to the deliver 1010 component, which in turn is implemented to deliver the composite cognitive insights in the form of a cognitive insight summary 1048 to the cognitive business processes and applications 304. In these embodiments, the cognitive platform 1010 is implemented to interact with an insight front-end 1056 component, which provides a composite insight and feedback interface with the cognitive business processes and applications 304. In certain embodiments, the insight front-end 1056 component includes an insight Application Program Interface (API) 1058 and a feedback API 1060, described in greater detail herein. In these embodiments, the insight API 1058 is implemented to convey the cognitive insight summary 1048 to the cognitive business processes and applications 304. Likewise, the feedback API 1060 is used to convey associated direct or indirect user feedback 1062 to the cognitive platform 1010. In certain embodiments, the feedback API 1060 provides the direct or indirect user feedback 1062 to the repository of models 1028 described in greater detail herein.

To continue the preceding example, the user may have received a list of candidate restaurants that may be suitable venues for meeting his clients. However, one of his clients has a pet that they like to take with them wherever they go. As a result, the user provides feedback 1062 that he is looking for a restaurant that is pet-friendly. The provided feedback 1062 is in turn provided to the insight agents to identify candidate restaurants that are also pet-friendly. In this example, the feedback 1062 is stored in the appropriate session graph 1052 associated with the user and their original query.

In various embodiments, as described in the descriptive text associated with FIGS. 5, 8 and 9, cognitive learning operations are iteratively performed during the learn 1036 phase to provide more accurate and useful composite cognitive insights. In certain of these embodiments, feedback 1062 received from the user is stored in a session graph that is associated with the user and stored in a repository of session graphs '1' through 'n' 1052, which is then used to provide more accurate composite cognitive insights in response to subsequent contextually-relevant queries from the user. In various embodiments, the feedback 1062 received from the user is used to perform cognitive learning operations, the results of which are then stored in a session graph that is associated with the user. In these embodiments, the session graph associated with the user is stored in a repository of session graphs '1' through 'n' 1052.

As an example, composite cognitive insights provided by a particular insight agent related to a first subject may not be relevant or particularly useful to a user of the cognitive business processes and applications 304. As a result, the user provides feedback 1062 to that effect, which in turn is stored in the appropriate session graph that is associated with the user and stored in a repository of session graphs '1' through 'n' 1052. Accordingly, subsequent insights provided by the insight agent related the first subject may be ranked lower, or not provided, within a cognitive insight summary 1048 provided to the user. Conversely, the same insight agent may provide excellent insights related to a second subject, resulting in positive feedback 1062 being received from the user. The positive feedback 1062 is likewise stored in the appropriate session graph that is associated with the user and stored in a repository of session graphs '1' through 'n' 1052. As a result, subsequent insights provided by the insight agent related to the second subject may be ranked higher within a cognitive insight summary 1048 provided to the user.

In various embodiments, the composite insights provided in each cognitive insight summary 1048 to the cognitive business processes and applications 304, and corresponding feedback 1062 received from a user in return, is provided to an associated session graph 1052 in the form of one or more insight streams 1064. In these and other embodiments, the insight streams 1064 may contain information related to the user of the cognitive business processes and applications 304, the time and date of the provided composite cognitive insights and related feedback 1062, the location of the user, and the device used by the user.

As an example, a query related to upcoming activities that is received at 10:00 AM on a Saturday morning from a user's home may return composite cognitive insights related to entertainment performances scheduled for the weekend. Conversely, the same query received at the same time on a Monday morning from a user's office may return composite cognitive insights related to business functions scheduled during the work week. In various embodiments, the information contained in the insight streams 1064 is used to rank the composite cognitive insights provided in the cognitive insight summary 1048. In certain embodiments, the composite cognitive insights are continually re-ranked as additional insight streams 1064 are received. Skilled practitioners of the art will recognize that many such embodiments are possible and the foregoing is not intended to limit the spirit, scope or intent of the invention.

Although the present invention has been described in detail, it should be understood that various changes, substitutions and alterations can be made hereto without departing from the spirit and scope of the invention as defined by the appended claims.

What is claimed is:

1. A cognitive learning method comprising:
  receiving data from a plurality of data sources;
  processing the data from the plurality of data sources to perform a cognitive learning operation, the processing being performed via a cognitive inference and learning system, the cognitive learning operation comprising a plurality of cognitive learning operation lifecycle phases, the cognitive learning operation lifecycle phases interacting with one another by providing and receiving data between adjacent phases, the cognitive learning operation applying a cognitive learning technique to generate a cognitive learning result, the cognitive inference and learning system comprising a cognitive platform, the cognitive platform comprising:
    a cognitive engine, the cognitive engine comprising a dataset engine, a graph query engine and an insight/learning engine,
    a plurality of sourcing agents, the plurality of sourcing agents sourcing the data from the plurality of data sources, and,
    a plurality of destination agents, the plurality of destination agents publishing the cognitive learning result to a consumer of cognitive insight data;
  updating a knowledge model using the cognitive learning result, the updating being performed via the cognitive platform of the cognitive inference and learning system; and,
  updating a destination based upon the cognitive learning result.

2. The cognitive learning method of claim 1, wherein:
  the plurality of cognitive learning operation lifecycle phases comprises a source learning operation lifecycle phase, the source learning operation lifecycle phase acquiring data from the plurality of data sources, the source learning operation lifecycle phase ensuring data ownership rights are observed on the data received from the plurality of data sources.

3. The cognitive learning method of claim 2, wherein:
  the plurality of cognitive learning operation lifecycle phases comprises a learn learning operation lifecycle phase, the learn learning operation lifecycle phase receiving information from the source learning operation lifecycle phase and managing cognitive learning operations via a cognitive learning agent.

4. The cognitive learning method of claim 3, wherein:
  the plurality of cognitive learning operation lifecycle phases comprises an infer learning operation lifecycle phase, the infer learning operation lifecycle phase receiving information from the learn learning operation lifecycle phase and performing an inference learning operation on the information, the inference learning operation comprising at least one of a concept entailment cognitive learning technique and a contextual recommendation cognitive learning technique.

5. The cognitive learning method of claim 4, wherein:
the plurality of cognitive learning operation lifecycle phases comprises an interpret learning operation lifecycle phase, the interpret learning operation lifecycle phase interpreting results from the learn learning operation lifecycle phase and the infer learning operation lifecycle phase to provide cognitive learning results for consumption by a recipient.

6. The cognitive learning method of claim 1, wherein:
the plurality of cognitive learning operation lifecycle phases comprises an act learning operation lifecycle phase, the act learning operation lifecycle phase receiving the cognitive learning results and effecting an action based upon the cognitive learning results.

\* \* \* \* \*